US012250445B2

(12) United States Patent
Lee et al.

(10) Patent No.: US 12,250,445 B2
(45) Date of Patent: Mar. 11, 2025

(54) CAMERA MODULE

(71) Applicant: Samsung Electro-Mechanics Co., Ltd., Suwon-si (KR)

(72) Inventors: Kyung Hun Lee, Suwon-si (KR); Jong Ho Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 95 days.

(21) Appl. No.: 18/078,253

(22) Filed: Dec. 9, 2022

(65) Prior Publication Data
US 2023/0188823 A1    Jun. 15, 2023

(30) Foreign Application Priority Data

Dec. 13, 2021 (KR) .......... 10-2021-0177869
Oct. 17, 2022 (KR) .......... 10-2022-0133456

(51) Int. Cl.
H04N 23/58 (2023.01)
G03B 13/36 (2021.01)
H04N 23/55 (2023.01)
H04N 23/69 (2023.01)

(52) U.S. Cl.
CPC .......... *H04N 23/58* (2023.01); *G03B 13/36* (2013.01); *H04N 23/55* (2023.01); *H04N 23/69* (2023.01)

(58) Field of Classification Search
CPC ........ H04N 23/58; H04N 23/55; H04N 23/69; H04N 23/54; G03B 13/36; G03B 3/10; G03B 5/00; G03B 5/02; G03B 30/00
See application file for complete search history.

(56) References Cited

U.S. PATENT DOCUMENTS

2017/0108705 A1*  4/2017  Yu .............................. G02B 7/09
2021/0377448 A1   12/2021  Seo et al.
2023/0085042 A1*  3/2023  Dhanda .................. H04N 23/45
                                                              348/222.1

FOREIGN PATENT DOCUMENTS

| KR | 10-1389375 B1     | 4/2014  |
| KR | 10-2017-0045978 A | 4/2017  |
| KR | 10-2018-0135392 A | 12/2018 |
| KR | 10-2020-0002358 A | 1/2020  |
| KR | 10-2021-0140848 A | 11/2021 |
| KR | 10-2021-0147215 A | 12/2021 |

OTHER PUBLICATIONS

Korean Office Action issued on Jul. 1, 2024, in counterpart Korean Patent Application No. 10-2022-0133456 (7 pages in English, 5 pages in Korean).

* cited by examiner

*Primary Examiner* — Yogesh K Aggarwal
(74) *Attorney, Agent, or Firm* — NSIP Law

(57) ABSTRACT

A camera module includes a lens unit including one or more lenses disposed in an optical axis direction; an image sensor on which light passing through the lens unit is incident; a first module including a first driving unit configured to move the lens unit in the optical axis direction; and a second module including a second driving unit configured to move the image sensor in a direction perpendicular to the optical axis direction, wherein the first module further includes a lens holder supporting the lens unit and at least partially overlapping the second module in a first direction perpendicular to the optical axis direction; and a housing in which the lens holder is disposed.

29 Claims, 18 Drawing Sheets

CAMERA MODULE

CROSS-REFERENCE TO RELATED APPLICATIONS

This application claims the benefit under 35 USC 119(a) of Korean Patent Application Nos. 10-2021-0177869 filed on Dec. 13, 2021, and 10-2022-0133456 filed on Oct. 17, 2022, in the Korean Intellectual Property Office, the entire disclosures of which are incorporated herein by reference for all purposes.

BACKGROUND

Field

The present disclosure relates to a camera module.

Description of Related Art

A camera module has become a standard feature in mobile communications terminals such as tablet personal computers (PCs) and laptop computers, as well as in smartphones.

The camera module may include an actuator having a focus adjustment function and an optical image stabilization (OIS) function to generate a high-resolution image. For example, the focus may be adjusted by moving a lens module in an optical axis (Z-axis) direction, and optical image stabilization may be performed by moving the lens module in a direction perpendicular to the optical axis (Z-axis) direction.

The weight of the lens module may increase when the performance of the camera module is improved, and a large driving unit may be needed to move the heavy lens module. However, the camera module used in mobile devices needs to be slim due to the limitation of the internal space of the mobile devices. Accordingly, there is a need for a camera module having a structure capable of stably controlling a high-performance lens module and having a slim size.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a camera module includes a lens unit including one or more lenses disposed in an optical axis direction; an image sensor on which light passing through the lens unit is incident; a first module including a first driving unit configured to move the lens unit in the optical axis direction; and a second module including a second driving unit configured to move the image sensor in a direction perpendicular to the optical axis direction, wherein the first module further includes a lens holder supporting the lens unit and at least partially overlapping the second module in a first direction perpendicular to the optical axis direction; and a housing in which the lens holder is disposed.

The lens holder may include a body part in which the lens unit is disposed; and an extension protruding from the body part in the optical axis direction, and a virtual first extension line extending in the first direction from an end portion of the extension in the optical axis direction may pass through the second module.

The first driving unit may include a first driving coil; a first driving magnet facing the first driving coil; and a first position sensor configured to detect a position of the first driving magnet.

The first driving magnet may be disposed in the extension, and the first driving coil may be fixed to the housing.

The first module may further include a first ball unit disposed between the housing and the lens holder, and the first ball unit may include a first ball group including a plurality of balls forming a first column parallel to the optical axis direction; and a second ball group including a plurality of balls forming a second column parallel to the optical axis direction and spaced apart from the first column.

A number of the plurality of balls of the first ball group may be different from a number of the plurality of balls of the second ball group.

The plurality of balls of the first ball group may include a plurality of first main balls and one or more first sub-balls disposed between the plurality of first main balls, and a diameter of each of the one or more first sub-balls may be smaller than a diameter of each of the plurality of first main balls.

The plurality of balls of the second ball group may include a plurality of second main balls and one or more second sub-balls, and a spacing between two first main balls that are farthest apart among the plurality of first main balls may be greater than a spacing between two second main balls that are farthest apart among the plurality of second main balls.

The first module may further include a first yoke spaced apart from the first driving magnet in the first direction, and an action point of a magnetic force applied to the first yoke by the first driving magnet may be closer to the first ball group than to the second ball group.

Either one or both of the housing and the lens holder may include a first guide groove in which the first ball group is disposed; and a second guide groove in which the second ball group is disposed, and a length of the first guide groove in the optical axis direction may be greater than or equal to a length of the second guide groove in the optical axis direction.

The camera module may further include a reinforcing member disposed in either one or both of the first guide groove and the second guide groove, wherein the reinforcing member may include a material having a degree of stiffness greater than a degree of stiffness of a material forming at least a portion of the lens holder.

The second module may include a moving frame configured to be movable together with the image sensor in the direction perpendicular to the optical axis direction; a fixed frame in which the moving frame is disposed; and a second ball unit including a plurality of balls disposed between the moving frame and the fixed frame.

The first extension line may pass through at least one of the plurality of balls of the second ball unit.

The housing may include a first accommodating portion having a space in which the extension is accommodated, and the fixed frame may include a seating portion on which the housing is disposed and including an opening through which the light passes; a second accommodating portion providing a receiving space in which the first accommodating portion may be accommodated; and a step portion disposed between the seating portion and the second accommodating portion.

At least a portion of the first accommodating portion may face the step portion in the first direction.

At least a portion of the extension may face the step portion in the direction perpendicular to the optical axis direction with the first accommodating portion interposed therebetween.

The second module may further include a sensor substrate including a moving part coupled to the moving frame and supporting the image sensor; a fixed part coupled to the fixed frame; and a connection part connecting the moving part and the fixed part to each other.

The second driving unit may include a second driving coil disposed on the moving frame or the fixed frame; a second driving magnet facing the second driving coil; and a second position sensor configured to detect a position of the second driving magnet.

The second driving unit may further include a third driving coil disposed at a right angle to the second driving coil; a third driving magnet facing the third driving coil; and a third position sensor configured to detect a position of the third driving magnet.

In another general aspect, a camera module includes a lens unit including one or more lenses disposed in an optical axis direction; a lens holder supporting the lens unit and configured to be movable in the optical axis direction; a first housing having an internal space in which the lens holder is disposed; a second housing coupled to the first housing and accommodating an optical member on which light passing through the lens unit is incident; and a plurality of balls disposed between the lens holder and the first housing and forming a first column and a second column spaced apart from each other and parallel to the optical axis direction, wherein the balls forming the first column and the balls forming the second column are arranged asymmetrically to each other, and at least a portion of the first housing is faces the second housing in a direction perpendicular to the optical axis direction.

The balls forming the first column may include a plurality of first main balls and one or more first sub-balls disposed between the plurality of first main balls, and a diameter of each of the plurality of first main balls may be larger than a diameter of each of the one or more first sub-balls.

The balls forming the second column may include one or more second main balls and one or more second sub-balls, two first main balls of the plurality of first main balls may be disposed at outermost sides of the first column in the optical axis direction, a diameter of each of the one or more second sub-balls is smaller than a diameter of each of the one or more second main balls, and one second sub-ball of the one or more second sub-balls may be disposed at one of the outermost sides of the second column in the optical direction.

A number of the balls forming the first column may be different from a number of the balls forming the second column.

The camera module may further include a case covering an upper portion of the first housing, wherein the case may include two protrusions respectively protruding toward the first column and the second column.

The camera module may further include a first driving unit configured to move the lens holder in the optical axis direction; and a second driving unit configured to move the optical member in the direction perpendicular to the optical axis direction, wherein the first driving unit may be disposed in the internal space of the first housing, and the second driving unit may be disposed outside the first housing.

The lens holder may include a body part in which the lens unit is disposed; and an extension protruding from the body part in the optical axis direction, and the first housing may face the second housing in the direction perpendicular to the optical axis direction and may include a first accommodating portion having a space in which the extension is accommodated.

The first accommodating portion may protrude from a lower surface of the first housing in the optical axis direction.

The second housing may include a seating portion on which the first housing is disposed and including an opening through which the light passes; a second accommodating portion providing a receiving space in which the first accommodating portion is accommodated; and a step portion extending in the optical axis direction and connecting the seating portion to the second accommodating portion.

The camera module may further include a moving frame configured to be movable with respect to the second housing together with the optical member, wherein at least a portion of the moving frame faces the step portion in the direction perpendicular to the optical axis direction.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
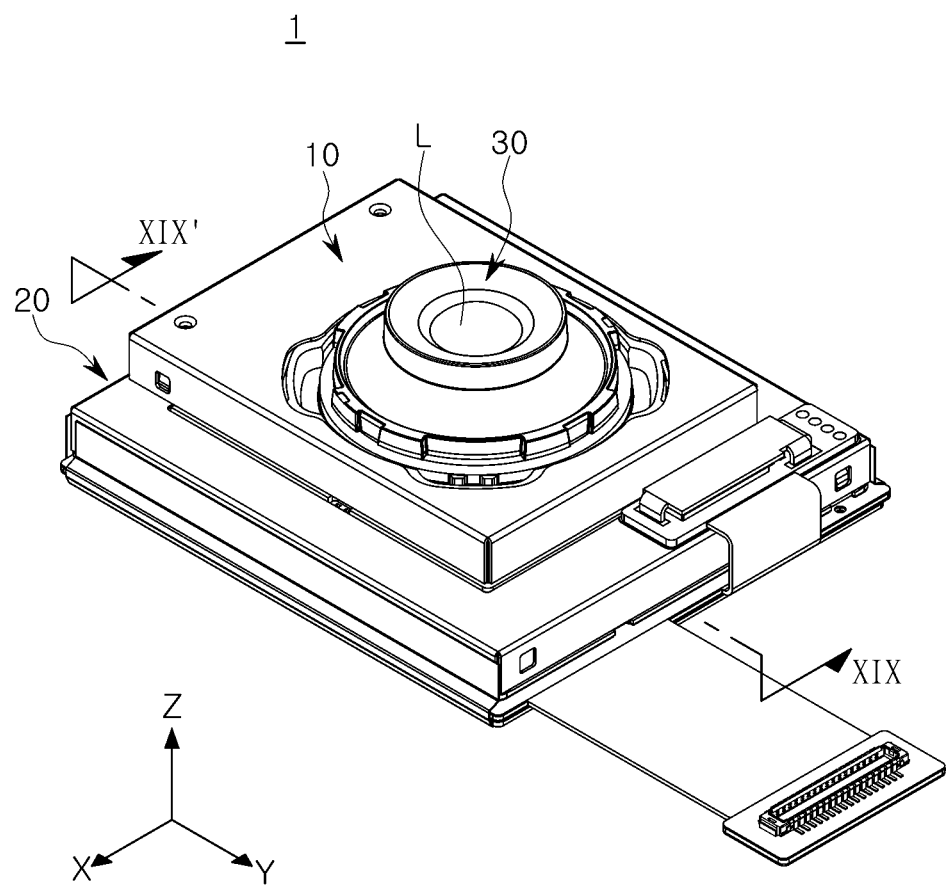
FIG. 1 is a perspective view of a camera module.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Figure 2:
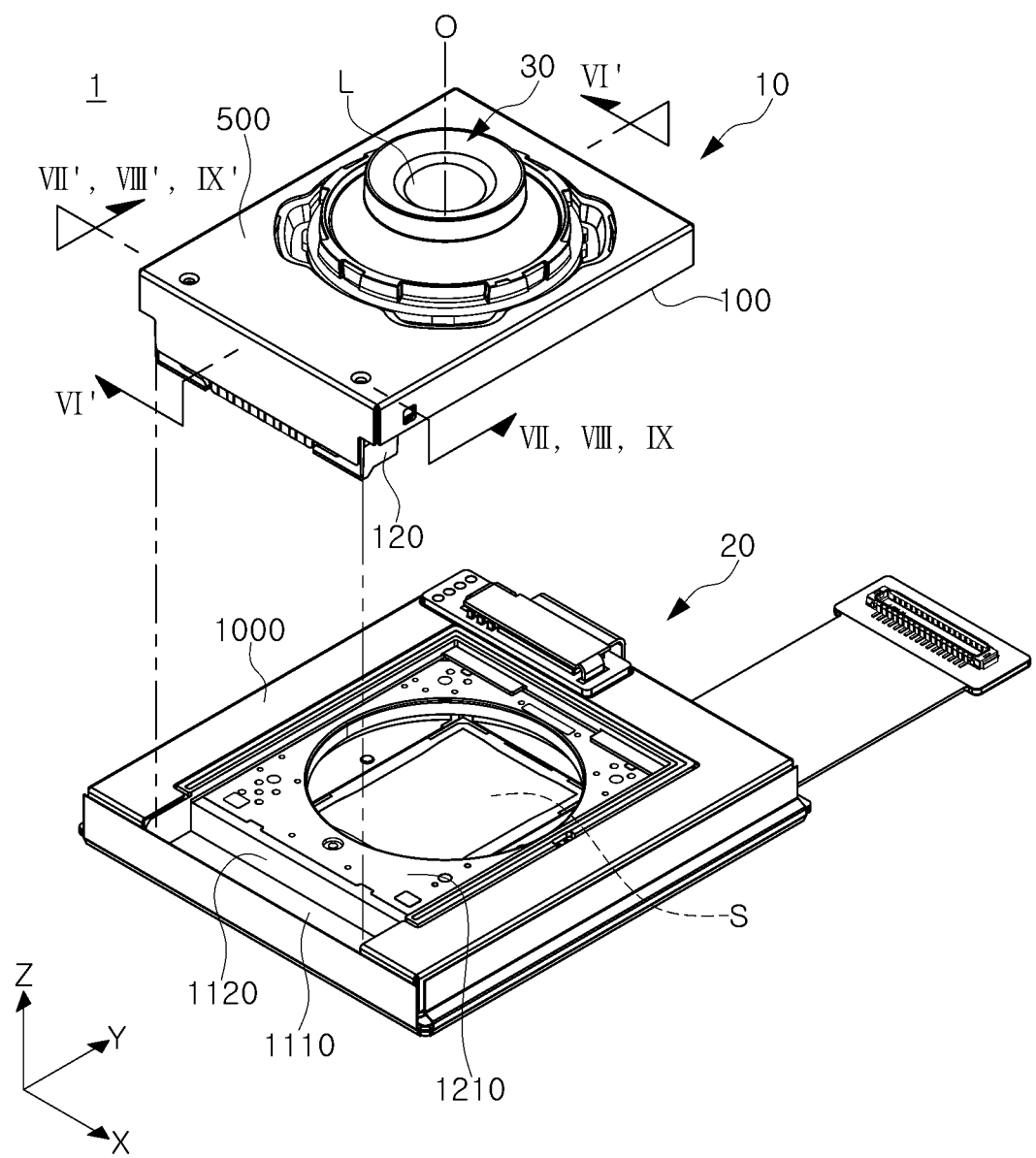
FIG. 2 is a reference diagram illustrating a combination of a first module and a second module included in the camera module of FIG. 1.

FIG. 1 is a perspective view of a camera module 1. FIG. 2 is a reference diagram illustrating a combination of a first module 10 and a second module 20 included in the camera module of FIG. 1.

The camera module 1 according to example embodiments may be mounted in a mobile electronic device. The mobile electronic device may be a portable electronic device such as a mobile communications terminal, a smartphone, or a tablet personal computer (PC).

Referring to FIGS. 1 and 2, the camera module 1 according to the example embodiments may include the first module 10 capable of moving a lens unit 30. In addition, the camera module 1 may further include the second module 20 capable of moving an image sensor S. For example, the first module 10 may be an actuator module for focus adjustment, and the second module 20 may be an actuator module for optical image stabilization (OIS).

Figure 3:
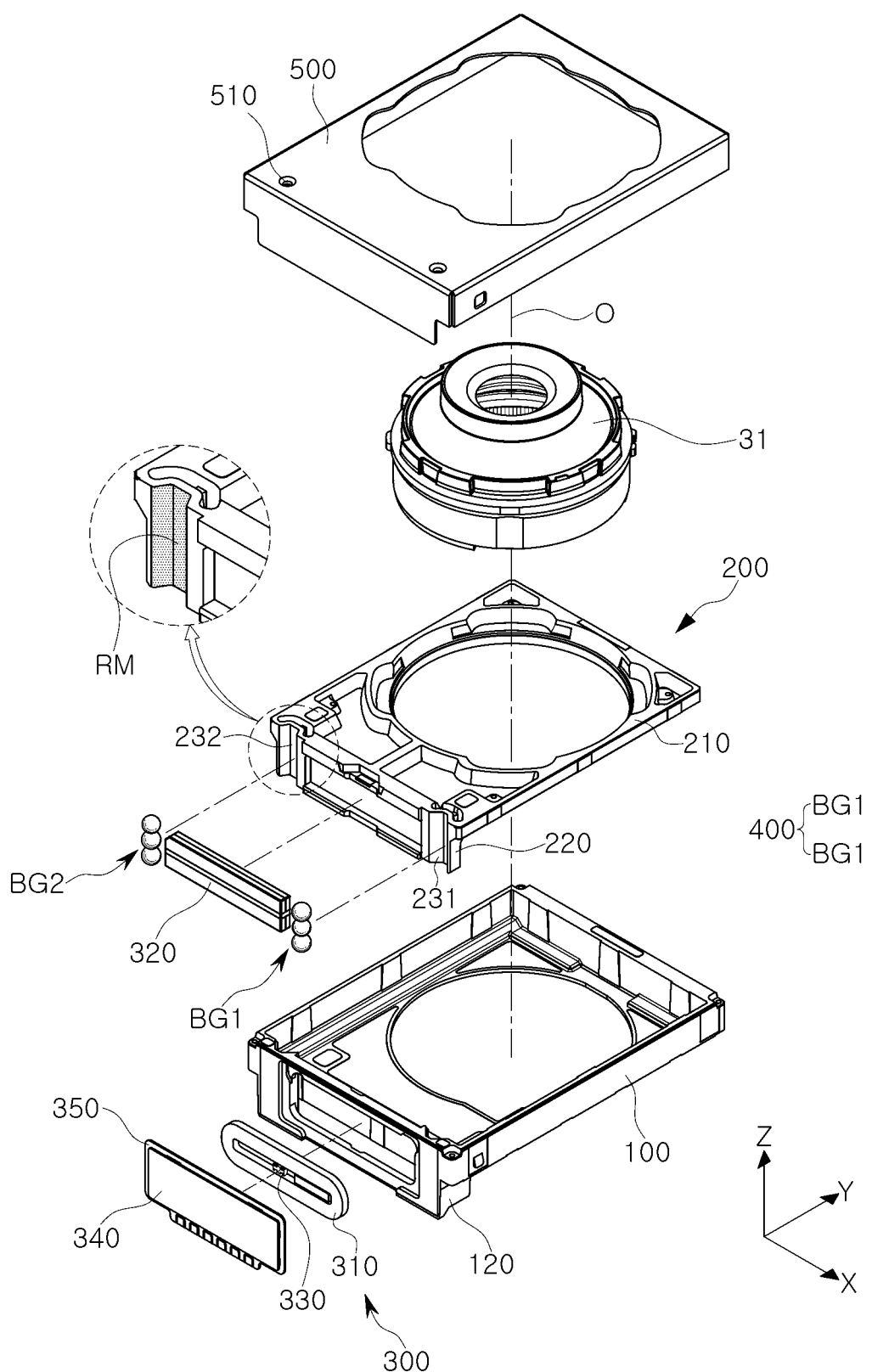
FIG. 3 is an exploded perspective view of the first module of FIG. 2 viewed from one angle.
Figure 4:
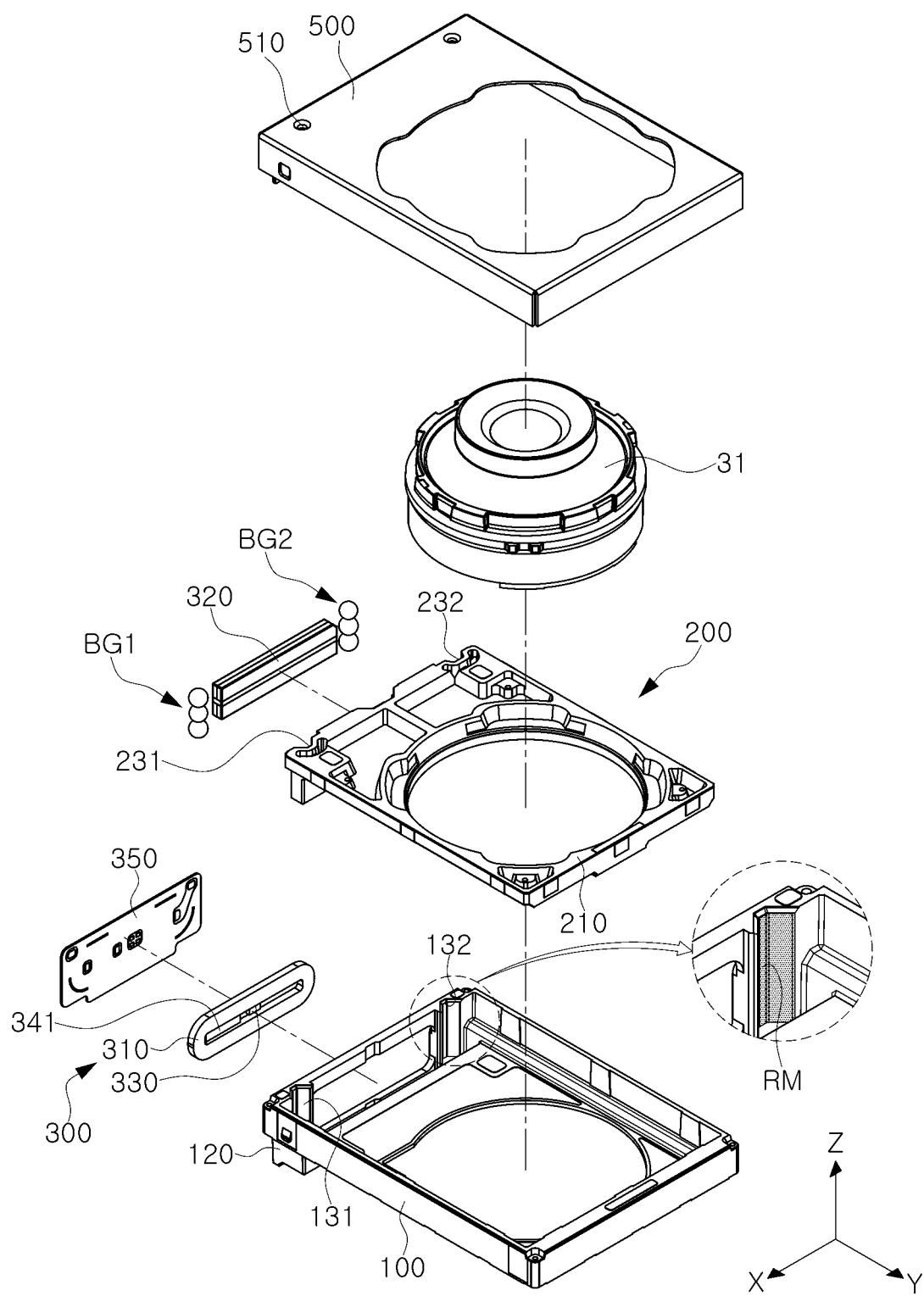
FIG. 4 is an exploded perspective view of the first module viewed from another angle.

The lens unit 30 includes at least one lens L and a lens barrel 31 (see FIGS. 3 and 4). At least one lens is disposed inside the lens barrel 31. When the plurality of lenses L are provided, the plurality of lenses L are mounted inside the lens barrel 31 along an optical axis O.

In example embodiments, the lens unit 30 may be moved in an optical axis direction (Z-axis direction) during autofocus adjustment (AF). To this end, the camera module 1 according to the example embodiments includes the first module 10 capable of moving the lens unit 30.

The lens unit 30 may be moved in the optical axis direction (Z-axis direction) by the first module 10 to adjust a focus. Also, the lens unit 30 may be fixed so as not to move while an optical image stabilization function is performed.

An optical member on which light passing through the lens unit may be incident may be disposed at a rear of the first module 10. For example, the camera module may include the lens unit 30, the first module 10, and an optical member disposed outside the first module 10.

The optical member may be an additional lens module, a reflection module, or the image sensor S, or an optical module in which these components are combined. For example, the optical member disposed at the rear of the first module 10 may be the image sensor S that may be moved with respect to the lens unit 30.

The camera module 1 according to the example embodiments may perform optical image stabilization by moving the image sensor S instead of the lens unit 30. Since the relatively light image sensor S is moved, the image sensor S may be moved with a smaller driving force. Therefore, optical image stabilization may be performed more precisely.

To this end, the camera module 1 according to the example embodiments includes the second module 20.

By the second module 20, the image sensor S may be moved in a direction perpendicular to the optical axis O or rotated about the optical axis O as a rotation axis to compensate for shaking. That is, by the second module 20, the image sensor S may be moved in the direction perpendicular to the direction in which an imaging plane of the image sensor S faces or rotated about the optical axis O as a rotation axis.

In this specification, the direction in which the imaging plane of the image sensor S faces may be referred to as the optical axis direction (Z-axis direction). That is, the image sensor S may be moved in the direction perpendicular to the optical axis direction (Z-axis direction).

In the drawings of the present application, the movement of the image sensor S in a direction parallel to the imaging plane may be understood that the image sensor S is moved in the direction perpendicular to the optical axis direction (Z-axis direction).

In addition, a movement of the image sensor S in the a direction (Y-axis direction) or a second direction (X-axis direction) may be understood that the image sensor S is moved in the direction perpendicular to the optical axis direction (Z-axis direction).

Also, for convenience, it has been described that the image sensor S may be rotated about the optical axis O as a rotation axis. However, when the image sensor S is rotated, the rotation axis may not coincide with the optical axis O. For example, the image sensor S may be rotated about any axis perpendicular to the direction in which the imaging plane of the image sensor S faces as a rotation axis, i.e., about any axis parallel to the optical axis O as a rotation axis.

In addition, the first direction (Y direction) and the second direction (X-axis direction) are examples of two directions perpendicular to the optical axis direction (Z-axis direction) and intersecting each other, and in the present specification, the first direction (Y-axis direction) and the second direction (X-axis direction) may be understood as two directions perpendicular to the optical axis O and intersecting each other.

Figure 5:
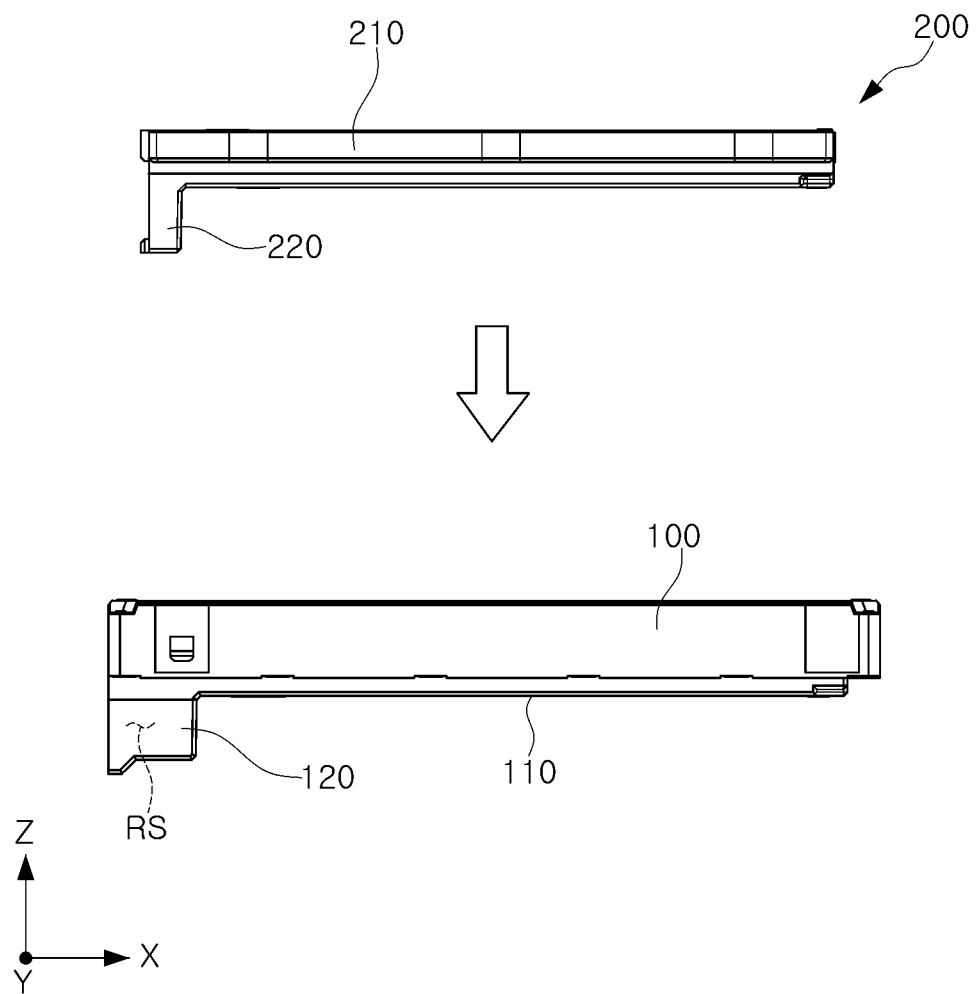
FIG. 5 is a side view of a lens holder and a housing included in the first module.
Figure 6:
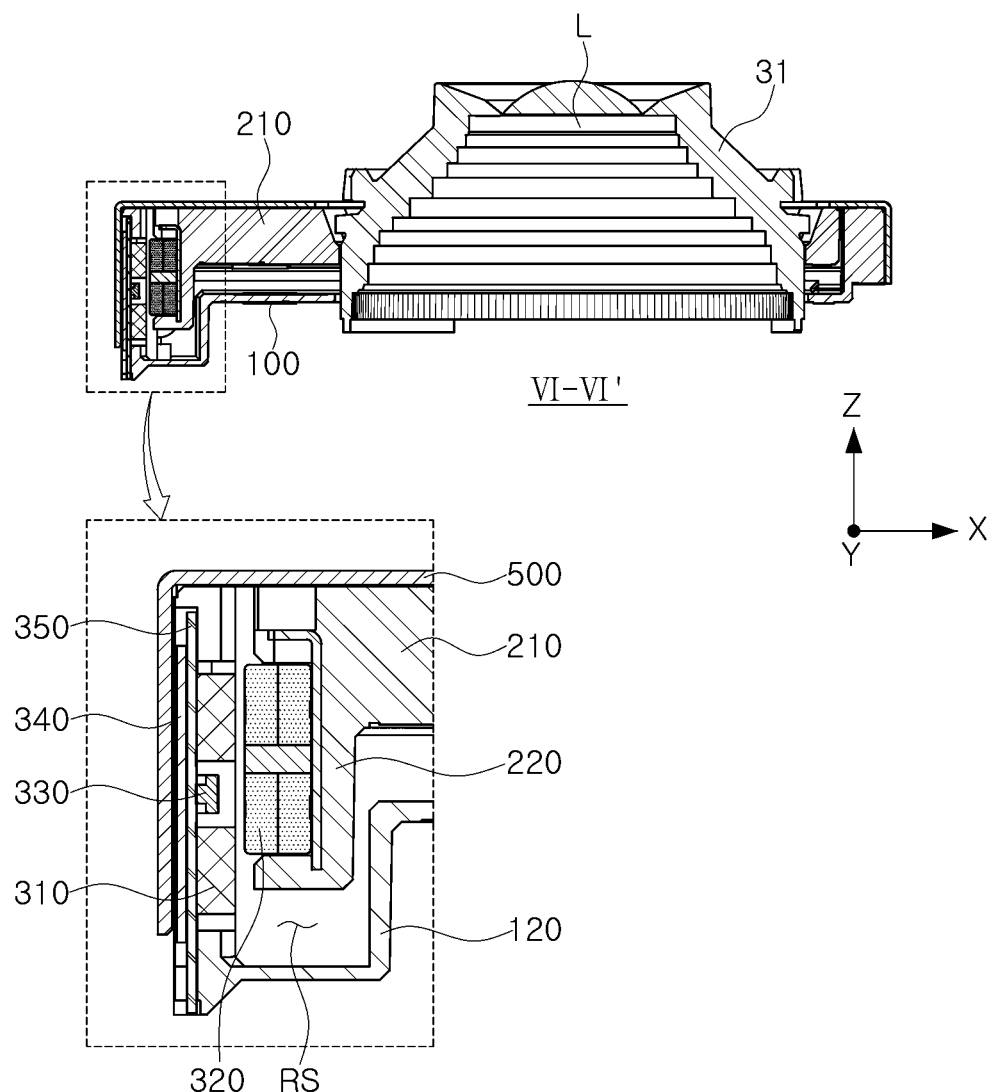
FIG. 6 is a cross-sectional view taken along the line VI-VI' of FIG. 2.

FIG. 3 is an exploded perspective view of the first module of FIG. 2 viewed from one angle. FIG. 3 is an exploded perspective view of the first module viewed from another angle. FIG. 5 is a side view of a lens holder and a housing included in the first module. FIG. 6 is a cross-sectional view taken along the line VI-VI' of FIG. 2. Since the lens unit 30 and the first module 10 in FIGS. 3 to 6 correspond to the lens unit 30 and the first module 10 in FIGS. 1 and 2 described above, a redundant description thereof may be omitted.

The first module 10 includes a lens holder 200 supporting the lens barrel 31, a housing 100, and a first driving unit 300, and may further include a case 500.

The lens holder 200 may have a hollow portion formed to penetrate in the optical axis direction (e.g., the Z-axis direction). The lens barrel 31 may be inserted into the hollow portion and fixed with respect to the lens holder 200. Accordingly, the lens barrel 31 and the lens holder 200 may be moved together in the optical axis O direction.

The housing 100 has an internal space in which the lens holder 200 may be accommodated, and may have an opened upper portion and an opened lower portion.

For example, the housing 100 may be configured so that the upper portion is completely opened but a lower surface 110 is partially opened in the optical axis direction, and light passing through the lens unit 30 may be emitted to the outside of the housing 100 through the opened area of the lower surface 110.

The case 500 may be coupled to the housing 100 to cover the upper portion of the housing 100 and to protect the internal elements of the first module 10.

The case 500 may be provided with protrusions 510 protruding toward a first ball unit 400 to be described later.

The protrusions 510 may serve as stoppers and buffer members for regulating a movement range of the first ball unit 400.

The first driver 300 may generate a driving force in the optical axis direction (Z-axis direction) to move the lens holder 200 in the optical axis direction (Z-axis direction).

The first driving unit 300 includes a first driving magnet 320 and a first driving coil 310 that electromagnetically interact with each other to generate a driving force. The first driving magnet 320 and the first driving coil 310 may be disposed to face each other in the first direction (Y-axis direction) perpendicular to the optical axis direction (Z-axis direction).

The first driving magnet 320 is disposed on the lens holder 200. For example, the first driving magnet 320 may be disposed on one side surface of the lens holder 200.

One side surface of the lens holder 200 may protrude farther in the optical axis direction (Z-axis direction) than the other portion of the lens holder 200. For example, the lens holder 200 may include a body part 210 in which the lens barrel 31 is disposed and an extension 220 protruding from the body part 210 in the optical axis direction (Z-axis direction).

The first driving magnet 320 may be disposed on the extension 220. Accordingly, a height of the first module 10 may be slimmed by reducing heights of other parts of the lens holder 200 while securing an installation space for the first driving unit 300 to secure a driving force.

A back yoke (not shown) may be disposed between the lens holder 200 and the first driving magnet 320. The back yoke may improve a driving force by preventing a magnetic flux of the first driving magnet 320 from leaking.

The first driving magnet 320 may be magnetized so that one surface (e.g., a surface facing the first driving coil 310) has both an N-pole and an S-pole. For example, the N-pole, a neutral region, and the S-pole may be sequentially arranged in the optical axis direction (Z-axis direction) on one surface of the first driving magnet 320 facing the first driving coil 310.

In addition, the other surface (e.g., an opposite surface to the one surface) of the first driving magnet 320 may be magnetized to have a polarity opposite to the polarity of the one surface. For example, an S-pole, a neutral region, and an N-pole may be sequentially arranged in the optical axis direction (Z-axis direction) on the other surface of the first driving magnet 320.

The first driving coil 310 is disposed to face the first driving magnet 320. For example, the first driving coil 310 may be disposed to face the first driving magnet 320 in the first direction (Y-axis direction), perpendicular to the optical axis O.

The first driving coil 310 is disposed on a substrate 350, and the substrate 350 may be mounted on the housing 100 so that the first driving magnet 320 and the first driving coil 310 face each other in the first direction (Y-axis direction) perpendicular to the optical axis O.

The first driving magnet 320 is a moving member mounted on the lens holder 200 and moving in the optical axis direction (Z-axis direction) together with the lens holder 200, and the first driving coil 310 may be a fixed member fixed to the substrate 350.

When power is applied to the first driving coil 310, the lens holder 200 is moved in the optical axis direction (Z-axis direction) by an electromagnetic force acting between the first driving magnet 320 and the first driving coil 310. As the lens holder 200 is moved, the lens barrel 31 disposed in the lens holder 200 may also be moved in the optical axis direction (Z-axis direction).

The first driving unit 300 may further include a first yoke unit 340 generating a supporting force for supporting the lens holder 200 in the housing 100. For example, the first driving unit 300 may further include the first yoke unit 340 facing the first driving magnet 320 in the first direction (Y-axis direction) with the first driving coil 310 interposed therebetween. However, components other than the first driving coil 310, such as the substrate 350, may be further disposed between the first driving magnet 320 and the first yoke unit 340.

The first yoke unit 340 may be disposed at a position where the first yoke unit 340 faces the first driving magnet 320. For example, the first driving coil 310 may be disposed on one surface of the substrate 350, and the first yoke unit 340 may be disposed on the other surface of the substrate 350.

The first yoke unit 340 may include a magnetic material to which the magnetic force of the first driving magnet 320 is applied. For example, the first yoke unit 340 may include a metal material, and a magnetic attraction may be generated between the first driving magnet 320 and the first yoke unit 340.

Due to the magnetic attraction generated between the first yoke unit 340 and the first driving magnet 320, the lens holder 200 may be supported on the housing 100 in the first direction (Y-axis direction).

The first yoke unit 340 may also serve to focus lines of magnetic force generated by the first driving magnet 320 to intensively pass through the first driving coil 310.

However, the arrangement of the first driving unit 300 according to the example embodiments is not limited to the above description. For example, the first driving magnet included in the first driving unit 300 may be disposed on the housing 100, and the first driving coil may be disposed on the extension 220 of the lens holder 200. In this case, the first yoke unit 340 may be disposed between the first driving coil and the lens holder 200.

Since a portion of the lens holder 200 further protrudes in the optical axis direction (Z-axis direction), one side surface of the housing 100 may have a shape that protrudes farther in the optical axis direction (Z-axis direction) than the other parts of the housing 100. For example, the housing 100 may include a lower surface 110 facing the body part 210 of the lens holder 200 in the optical axis direction (Z-axis direction) and a first accommodating portion 120 that protrudes farther in the optical axis direction (Z-axis direction) than the lower surface 110.

A receiving space RS may be formed in the first accommodating portion 120, and the extension 220 of the lens holder 200 may be accommodated in the receiving space RS.

Since the first accommodating portion 120 protrudes farther downward in the optical axis direction (Z-axis direction) than the lower surface 110 of the housing 100, the lower surface 110 and the first accommodating portion 120 may have a step difference structure. Accordingly, the height of the first module 10 may be slimmed by reducing heights of the other parts of the housing 100 while securing the installation space for the first driving unit 300 to secure a driving force. Here, the "protruding downwards" may refer to protruding in a traveling direction of light passing through the lens unit 30.

A first ball unit 400 may be disposed between the lens holder 200 and the housing 100. For example, the first ball unit 400 may be disposed in guide grooves 231 and 232 formed in the extension 220 of the lens holder 200 and guide grooves 131 and 132 formed in the housing 100. The first ball unit 400 includes a plurality of balls disposed in an optical axis direction (Z-axis direction). The plurality of balls may be rolled or rotated in place in the optical axis direction (Z-axis direction) when the lens holder 200 is moved in the optical axis direction (Z-axis direction).

The first ball unit 400 may be held in contact with the lens holder 200 and the housing 100 by the magnetic attraction generated between the first driving magnet 320 and the first yoke unit 340.

The guide grooves 131, 132, 231, and 232 may each be formed in surfaces of the lens holder 200 and the housing 100 that face each other. For example, the extension 220 of the lens holder 200 may be provided with a first guide groove 231 and a second guide groove 232, and the housing 100 may be provided with a third guide groove 131 and a fourth guide groove 132. The first guide groove 231 and the second guide groove 232 may be disposed to face the third guide groove 131 and the fourth guide groove 132, respectively.

The guide grooves 131, 132, 231, and 232 may have a groove shape extending in the optical axis direction (Z-axis direction). The first ball unit 400 may be disposed between the first guide groove 231 and the third guide groove 131 and between the second guide groove 232 and the fourth guide groove 132.

The first ball unit 400 may be arranged to form a plurality of columns extending in a direction parallel to the optical axis direction (Z-axis direction). For example, some of the balls of the first ball unit 400 may form a first ball group BG1 by being arranged in a direction parallel to the optical axis direction (Z-axis direction). The balls of the first ball group BG1 may form a first column. In addition, some of the balls of the first ball unit 400 may be spaced apart from the first ball group BG1 and arranged in a direction parallel to the optical axis direction (Z-axis direction) to form a second ball group BG2. The balls BG2 of the second ball group may form a second column.

In the ball groups BG1 and BG2 forming two columns parallel to each other, the ball members forming the first column and the ball members forming the second column may be arranged asymmetrically to each other. Such a ball arrangement will be described later in detail with reference to FIGS. 7 to 9.

Continuing to refer to FIGS. 3 and 4, each of the ball groups BG1 and BG2 may be disposed in different guide grooves. For example, the first ball group BG1 may be disposed in the first guide groove 231 and the third guide groove 131, and the second ball group BG2 may be disposed in the second guide groove 232 and the fourth guide groove 132.

When an impact is applied to the first module 10, there may be a risk that a shape of a portion in contact with the first ball unit 400 in the guide grooves 131, 132, 231, and 232 will be deformed (a so-called dent phenomenon). For example, an external impact is concentrated on a narrow contact surface between the first ball unit 400 and the guide grooves 131, 132, 231, and 232, so there may be a risk that the guide grooves 131, 132, 231, and 232 are dented. When the dent phenomenon occurs, there may be a risk that the relative position between the lens holder 200 and the housing 100 is changed, which may make it difficult to precisely control the position of the lens holder 200.

In order to prevent such a dent phenomenon, the first module 10 may further include a reinforcing member RM disposed in at least one of the guide grooves 131, 132, 231, and 232.

The reinforcing member RM may have a shape corresponding to the shape of the guide grooves 131, 132, 231, and 232. For example, when the guide grooves 131, 132, 231, and 232 are V-shaped grooves extending in the optical axis direction (Z-axis direction), the reinforcing member RM may be provided as a V-shaped member that fits inclined surfaces of the guide grooves 131, 132, 231, and 232.

The reinforcing member RM may be made of a material having a higher stiffness than a material constituting at least a portion of the housing 100 or the lens holder 200. For example, when the guide grooves 131, 132, 231, and 232 of the housing 100 or the lens holder 200 are made of a plastic material, the reinforcing member RM is made of a material (for example, a non-conductive metal material) having a higher stiffness than plastic.

The reinforcing member RM may be provided as a separate part and coupled to the guide grooves 131, 132, 231, and 232. For example, the reinforcing member RM may be adhered to the guide grooves 131, 132, 231, and 232 using an adhesive. Alternatively, the guide grooves 131, 132, 231, and 232 and the reinforcing member RM may be integrally formed by insert injection molding the reinforcing member RM in the process of manufacturing the housing 100 or the lens holder 200.

When the reinforcing member RM is disposed in the guide grooves 131, 132, 231, and 232, the impact resistance of the guide grooves 131, 132, 231 and 232 may be increased.

The first module 10 may detect the position of the lens holder 200 in the optical axis direction (Z-axis direction). To this end, a first position sensor 330 may be disposed. The first position sensor 330 may be disposed on the substrate 350 to face the first driving magnet 320. For example, the first position sensor 330 may be a Hall sensor.

Hereinafter, the arrangement structure of the first driving unit and the first ball unit included in the first module 10 will be described in detail with reference to FIGS. 7 to 10.

Figure 7:
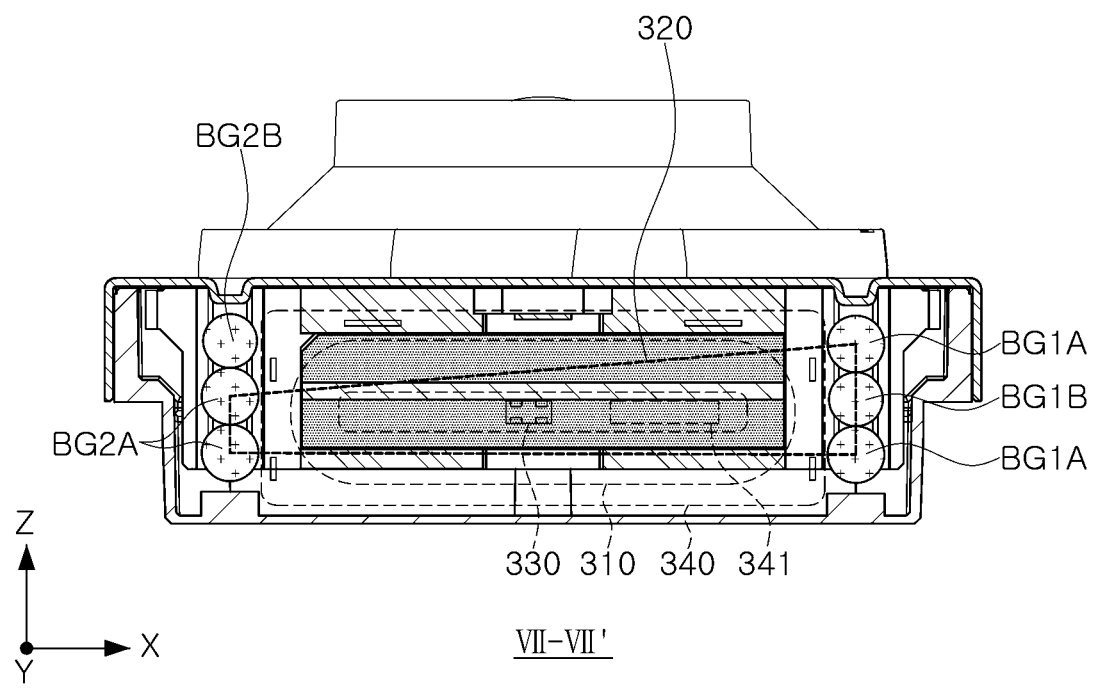
FIG. 7 is an example of a cross-sectional view taken along the line VII-VII' of FIG. 2.
Figure 8:
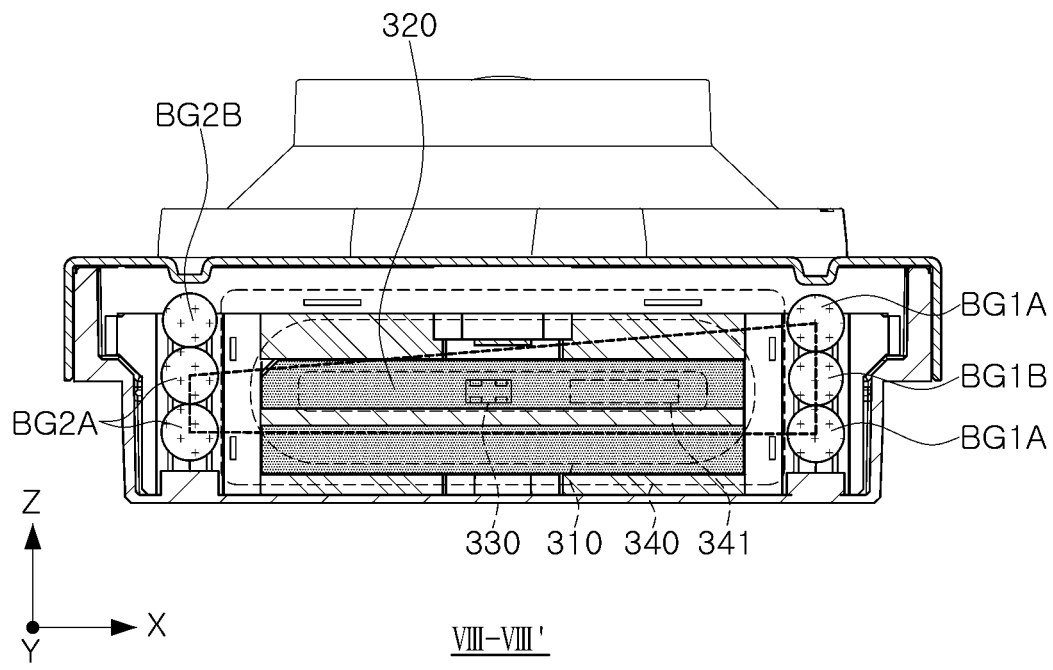
FIG. 8 is another example of a cross-sectional view taken along the line VIII-VIII' of FIG. 2.
Figure 9:
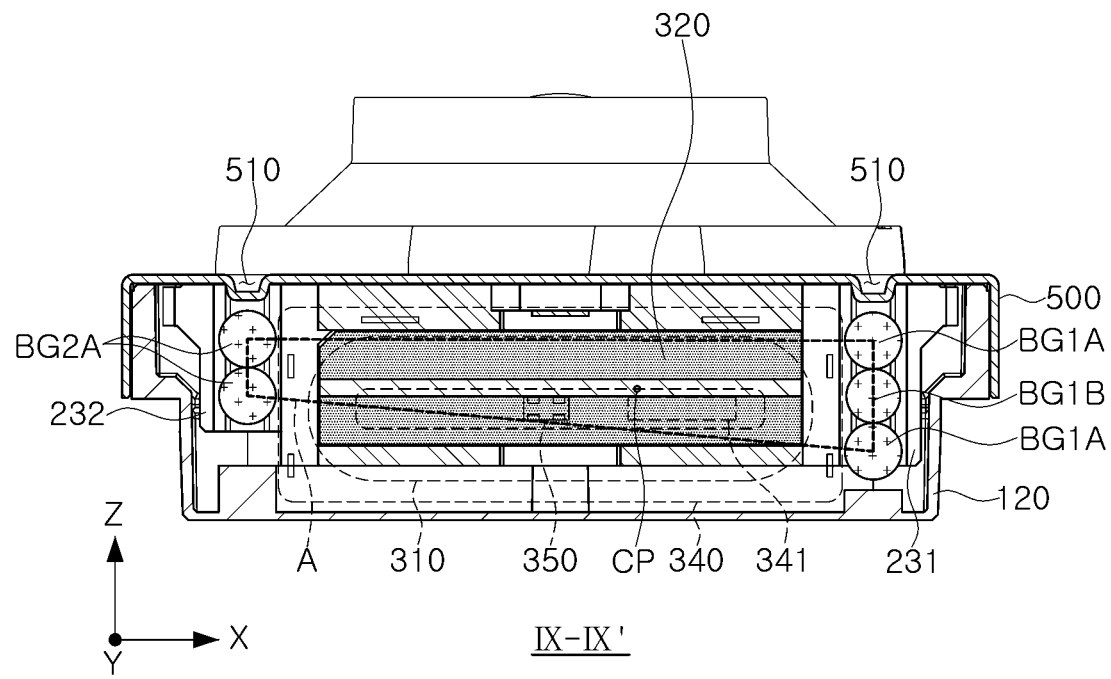
FIG. 9 is another example of a cross-sectional view taken along the line IX-IX' of FIG. 2.
Figure 10:
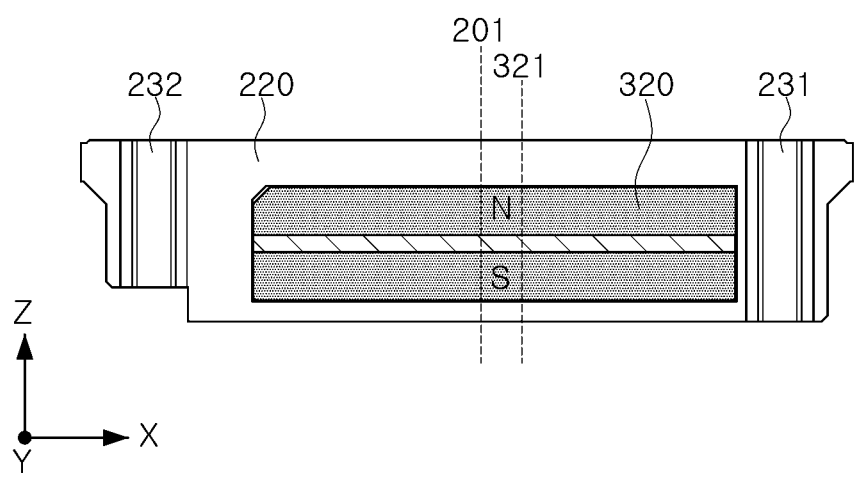
FIG. 10 is a diagram illustrating an example in which a first driving magnet of the first module is biased toward one side of an extension of a lens holder of the first module.

FIG. 7 is an example of a cross-sectional view taken along the line VII-VII' of FIG. 2. FIG. 8 is another example of a cross-sectional view taken along the line VIII-VIII' of FIG. 2. FIG. 9 is another example of a cross-sectional view taken along the line IX-IX' of FIG. 2. FIG. 10 is a diagram illustrating an example in which a first driving magnet of the first module is biased toward one side of an extension of a lens holder of the first module.

Since the first module 10 and its components described in FIGS. 7 and 8 correspond to the first module 10 and its components described above with reference to FIGS. 1 to 6, a redundant description thereof will be omitted.

The first module 10 may include a first ball unit 400 including a plurality of balls disposed between the lens holder 200 and the housing 100.

In the first module 10 according to the example embodiments, a size (e.g., a diameter) of some of the plurality of balls of the first ball unit 400 may be smaller than a size (e.g., a diameter) of the remaining balls of the first ball unit 400. In such a case, the balls having a larger size among the plurality of balls may be intentionally brought into contact with the lens holder 200 and the carrier 200.

For example, referring to FIG. 7, some of the plurality of balls forming the first ball group BG1 may be relatively large balls BG1A, and the others may be relatively small balls BG1B. In the following description, a ball having a relatively large size is defined as a "main ball," and a ball having a relatively small size is defined as a "sub-ball." Also, some of the plurality of balls forming the second ball group BG2 may be relatively large balls BG2A, and the others may be relatively small balls BG2B. In the following description, a ball having a relatively large size is defined as a "main ball," and a ball having a relatively small size is defined as a "sub-ball."

Between the lens holder 200 and the housing 100, the main balls BG1A and BG2A having a large diameter may be in contact with the lens holder 200, and the sub-balls BG1B and BG2B having a small diameter may not be in contact with the lens holder 200. That is, the lens holder 200 may be in contact with the main balls BG1A and BG2A and supported on an inner wall of the housing. In this case, the sub-balls BG1B and BG2B serve to maintain a spacing between the main balls BG1A and BG2A, keep the main balls BG1A and BG2A in place, and help support the lens holder 200 ton the housing 100.

The first ball group BG1 may include a plurality of first main balls BG1A and a first sub-ball BG1B disposed therebetween.

The second ball group BG2 may include one or more second main balls BG2A and one or more second sub-balls BG2B arranged in line with the second main balls BG2A in the optical axis direction.

Referring to FIG. 7, a spacing between two first main balls BG1A in the first ball group BG1 may be greater than a spacing between two second main balls BG2A in the second ball group BG2.

For example, in the first ball group BG1 forming the first column, the two first main balls BG1A may be disposed at both outermost sides of the first column, respectively. In addition, in the second ball group BG2 forming the second column, the second sub-ball BG2B may be disposed at one outermost side of the second column, the second main ball BG2A may be disposed at the other outermost side of the second column, and another second main ball BG2A may be disposed therebetween.

The lens holder 200 may be supported on the housing by contact with the main balls BG1A and BG2A. In this case, lines connecting the centers (which are defined as contact points) of the main balls BG1A and BG2A supporting the lens holder defines a virtual area having a predetermined area. This virtual area is defined as a "support area." For example, in FIG. 7, a support area having a trapezoidal shape in which a line connecting the centers of the main balls BG1A of the first ball group BG1 is longer than a line connecting the centers of the main balls BG2A of the second ball group BG2.

In example embodiments, an action point of the magnetic attraction acting between the first driving magnet 320 and the first yoke unit 340 (hereinafter, referred to as a "support center point") may be positioned inside the support area.

Since the support center point is positioned inside the support area, the first driving magnet 320 and the lens holder 200 may be stably supported on the inner wall of the housing by the main balls BG1A and BG2A. Accordingly, the lens holder 200 may be moved in parallel as much as possible in the optical axis direction (Z-axis direction) without being tilted with respect to the housing 100.

As the lens holder 200 is moved in the optical axis direction (Z-axis direction), the first driving magnet 320 is also moved in the optical axis direction (Z-axis direction), so there may be a risk that the support center point may deviate from the support area. To prevent this, the support center point may be biased toward one side of the support area.

For example, referring to FIG. 7, the first yoke unit 340 may further include a protrusion 341 protruding toward the first driving magnet 320. The protrusion 341 may be made of a magnetic material on which the magnetic force of the first driving magnet may act, like other parts of the first yoke unit 340. For example, the protrusion 341 may be an integrally formed portion of the first yoke unit 340. Since the first yoke unit 340 additionally includes the protrusion 341, the support center point of the magnetic attraction acting between the first driving magnet 320 and the first yoke unit 340 may be biased toward the side of the support area in which the protrusion 341 is disposed.

In example embodiments, the protrusion 341 of the first yoke unit 340 may be disposed closer to the first ball group BG1 than to the second ball group BG2. Referring to FIG. 7, the first main balls BG1A of the first ball group BG1 may be disposed at a relatively wider spacing than the second main balls BG2A of the second ball group BG2. In this case, the support area may have a trapezoidal shape in which a side of the trapezoidal shape connecting the centers of the main balls BG1A of the first ball group BG1 is longer than a side of the trapezoidal shape connecting the centers of the main balls BG2A of the second ball group BG2.

Since the protrusion 341 of the first yoke unit 340 causes the support center point to be positioned closer to the longer side of the trapezoidal shape connecting the centers of the main balls BG1A of the first ball group BG1, even if the support center point moves a long distance, the support center point may not deviate from the trapezoidal shape. Accordingly, while the lens holder 200 moves a long distance in the optical axis direction, the lens holder 200 is not tilted with respect to the housing 100 and may be moved as much as possible in parallel in the optical axis direction (Z-axis direction).

In the first module 10, the length of the first guide groove 231 serving as a main guide may be different from the length of the second guide groove 232 serving as an auxiliary guide. Hereinafter, examples of the lens holder 200 having guide grooves of different lengths will be described with reference to FIGS. 9 and 10.

The difference between FIGS. 7 and 8 is that the positions of the first position sensor 330, the protrusion 341 of the first yoke unit 340, the first main balls BG1A, the first sub-ball BG1B, the second main balls BG2A, and the second sub-ball BG2B are different.

FIG. 9 is another example of a cross-sectional view taken along the line IX-IX' of FIG. 2. FIG. 10 is a diagram illustrating an example in which a first driving magnet of the first module is biased toward one side of an extension of a lens holder of the first module.

In example embodiments, the lengths of the first guide groove 231 and the second guide groove 232 may be different from each other. For example, referring to FIGS. 9 and 10, the length in the optical axis direction (Z-axis direction) of the first guide groove 231 may be longer than the length in the optical axis direction (Z-axis direction) of the second guide groove 232.

The first guide groove 231 may protrude in the optical axis direction (Z-axis direction) below the lower surface of the body part 210 of the lens holder 200. For example, one portion of the extension 220 of the lens holder 200 may protrude below the optical axis direction (e.g., negative Z-axis direction) compared to the other portions of the lens holder 200, and the first guide groove 231 may be formed in the protrusion.

For example, a portion of the extension 220 of the lens holder 200 in which the first guide groove 231 is formed may protrude farther in the negative optical axis direction (negative Z-axis direction) than a portion of the extension 220 in which the second guide groove 232 is formed. Accordingly, the length of the first guide groove 231 may be longer than the length of the second guide groove 232.

In addition, the length of the third guide groove 131 facing the first guide groove 231 may be longer than the length of the fourth guide groove 132 facing the second guide groove 232.

The length of the second guide groove 232 in the optical axis direction (Z-axis direction) may be approximately the same as the length of the body part 210 of the lens holder 200 in the optical axis direction (Z-axis direction). However, the length of the second guide groove 232 in the optical axis direction (Z-axis direction) is not limited thereto. For example, the length of the second guide groove 232 in the optical axis direction (Z-axis direction) may be longer than the length of the body part 210 in the optical axis direction (Z-axis direction), and may be shorter than the length of the first guide groove 231 in the optical axis direction (Z-axis direction).

In example embodiments, the number of balls of the first ball group BG1 disposed in the first guide groove 231 and the number of balls of the second ball group BG2 disposed in the second guide groove 232 may be different from each other.

For example, referring to FIG. 9, the first ball group BG1 may include three balls BG1A and BG1B, and the second ball group BG2 may include two balls BG2A. The two balls BG2A of the second ball group BG2 may have the same diameter. For example, both of the two balls BG2A of the second ball group BG2 have a first diameter. In the first ball group BG1, two balls BG1A disposed at the outermost sides in the optical axis direction (Z-axis direction) may have the same diameter as each other, and the diameter of the one ball BG1B disposed therebetween may be smaller than the diameter of each of the two balls BG2A disposed at the outermost sides in the optical axis direction (Z-axis direction). For example, in the first ball group BG1, the two balls BG1A disposed at the outermost sides in the optical axis direction (Z-axis direction) may have a second diameter, and the one ball BG1B disposed therebetween may have a third diameter, wherein the second diameter may be greater than the third diameter. In addition, the first diameter and the second diameter may be the same as each other. The same diameter may be a concept including not only physically the same diameter, but also an error in manufacturing.

According to the arrangement of the balls as described above, even if the second guide groove 232 is shorter than the first guide groove 231, it is possible to secure a support area A having a sufficient width. Accordingly, it is possible to implement the lens holder 200 to be slimmer and have a lighter weight.

Since the lens holder 200 and the first driving magnet 320 are moved in the optical axis direction (Z-axis direction), the support center point CP may deviate from the support area A, so there may be a risk that the lens holder 200 may be tilted.

To prevent this, the support center point CP of the lens holder 200 may be positioned closer to the first guide groove 231 having a relatively longer length than the second guide groove 232.

For example, referring to FIG. 9, the protrusion 341 is additionally included in the first yoke unit 340, and the support center point CP formed by the first driving magnet 320 and the first yoke unit 340 may be biased toward the side on which the protrusion 341 is disposed. Accordingly, the support center point CP may be positioned closer to the first guide groove 231 than the second guide groove 232.

Alternatively, irrespective of the structure of the above-described first yoke unit 340, the support center point CP may be positioned closer to the first guide groove 231 than the second guide groove 232 by changing a position of the first driving magnet 320.

For example, as illustrated in FIG. 10, with respect to a center 201 of one side surface of the lens holder 200, the first driving magnet 320 may be disposed to be biased toward one side of the first driving magnet 320 in the longitudinal direction (e.g., X-axis direction).

The center 201 of one side surface of the lens holder 200 and a center 321 of the first driving magnet 320 may be separated from each other. The direction in which the first driving magnet 320 is eccentric may be toward the first guide groove 231. That is, the first driving magnet 320 may be disposed closer to the first guide groove 231 than the second guide groove 232.

Since the support area A may be formed to have a longer length in the optical axis direction (Z-axis direction) as it is closer to the first guide groove 231, the first driving magnet 320 may be disposed closer to the first guide groove 231 so the support center point (CP) may be more stably positioned within the support area A.

In the first module described with reference to FIGS. 9 and 10, it is to be noted that all features other than those described above may be applied to the features of the first module described with reference to FIGS. 7 and 8.

Hereinafter, the second module 20 included in the camera module will be described in detail with reference to FIGS. 11 to 17.

Figure 11:
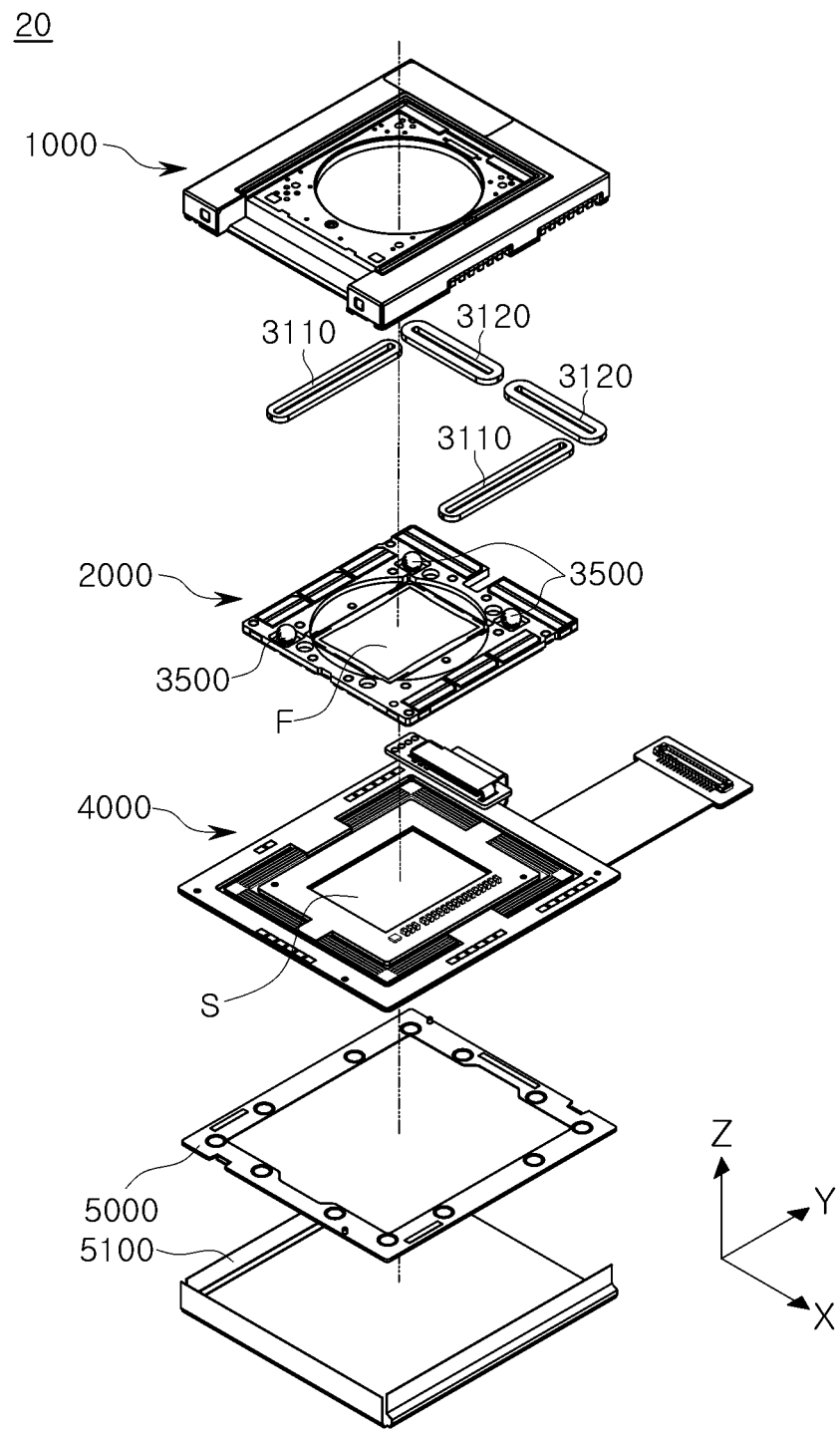
FIG. 11 is an exploded perspective view of the second module of FIG. 2.
Figure 12:
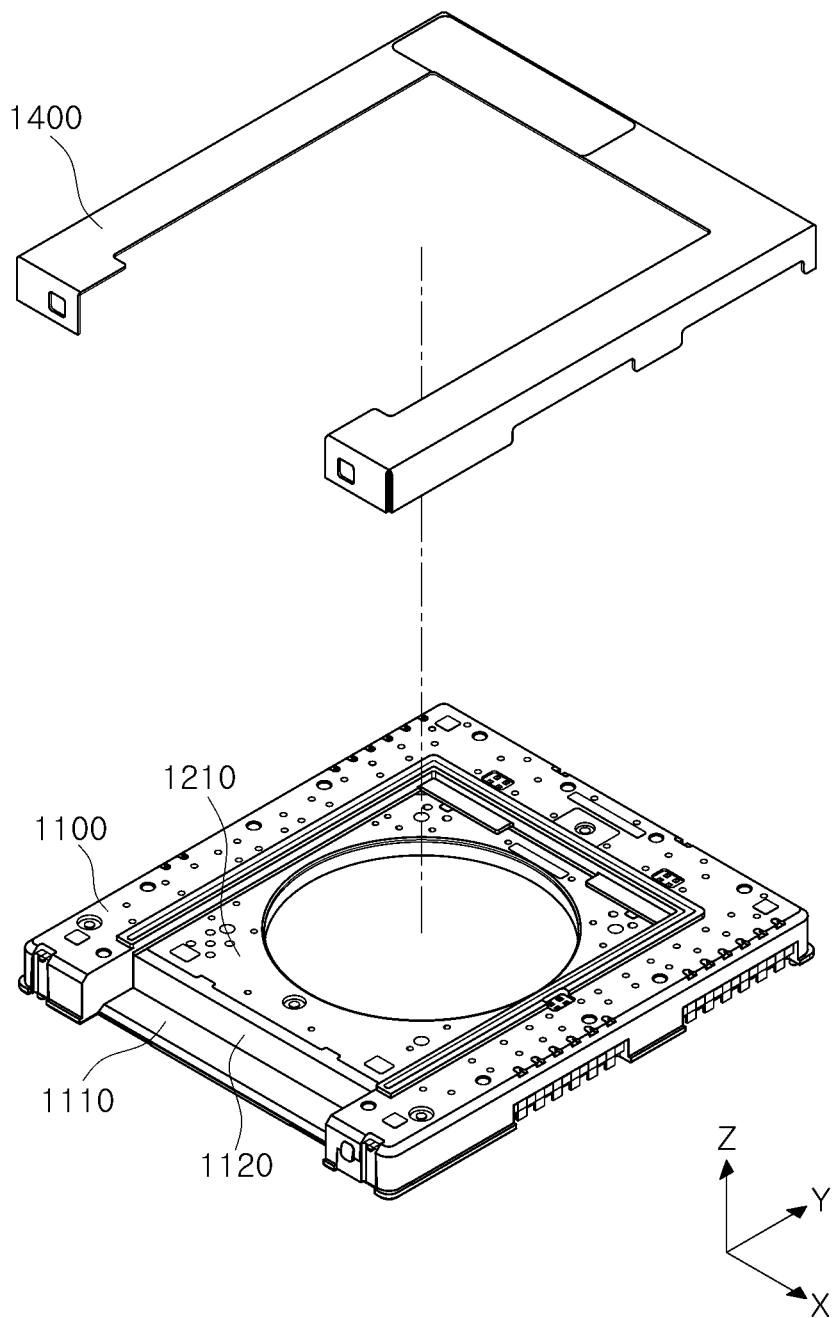
FIG. 12 is a perspective view of a fixed frame included in the second module.
Figure 13:
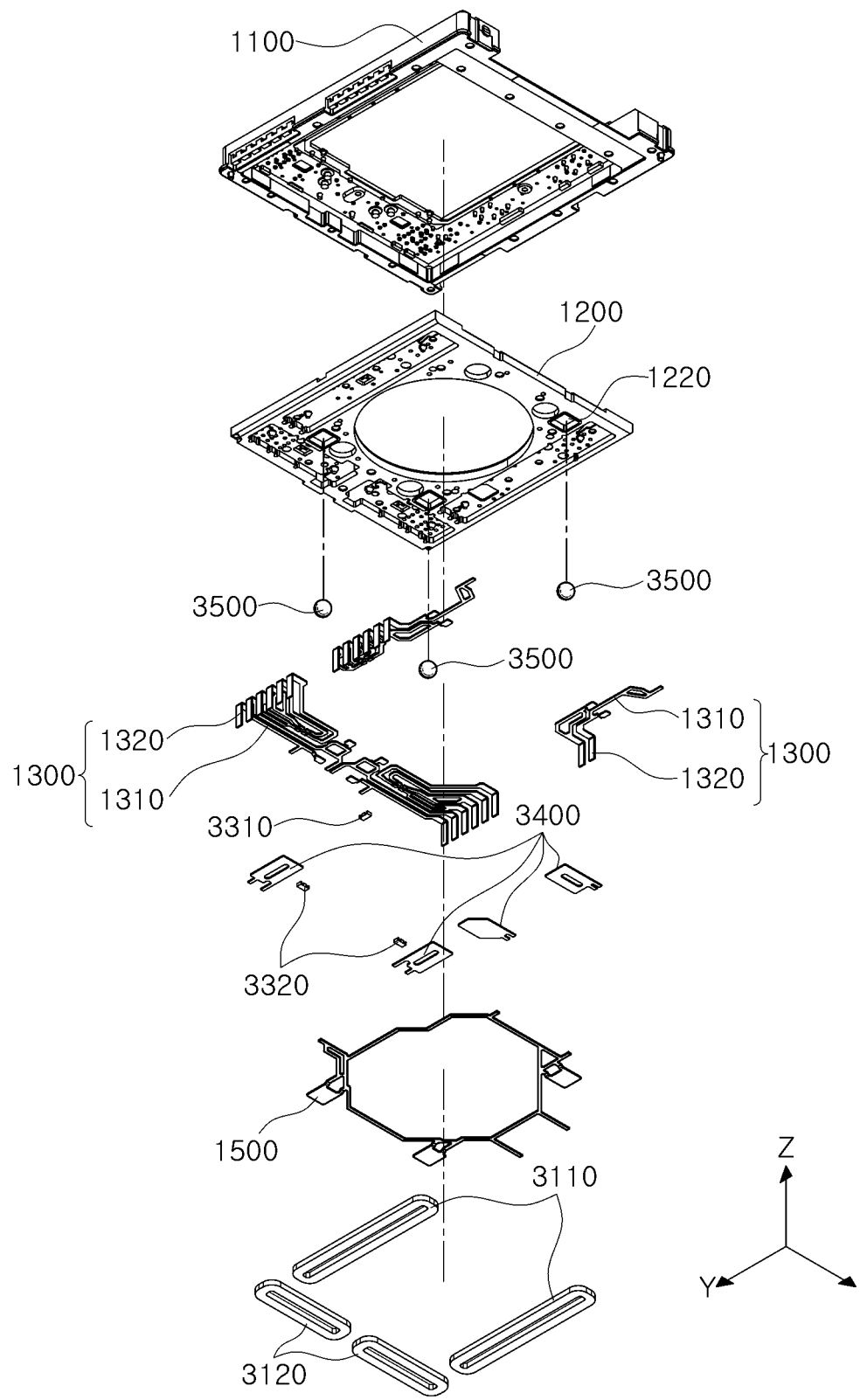
FIG. 13 is an exploded bottom perspective view of the fixed frame included in the second module.
Figure 14:
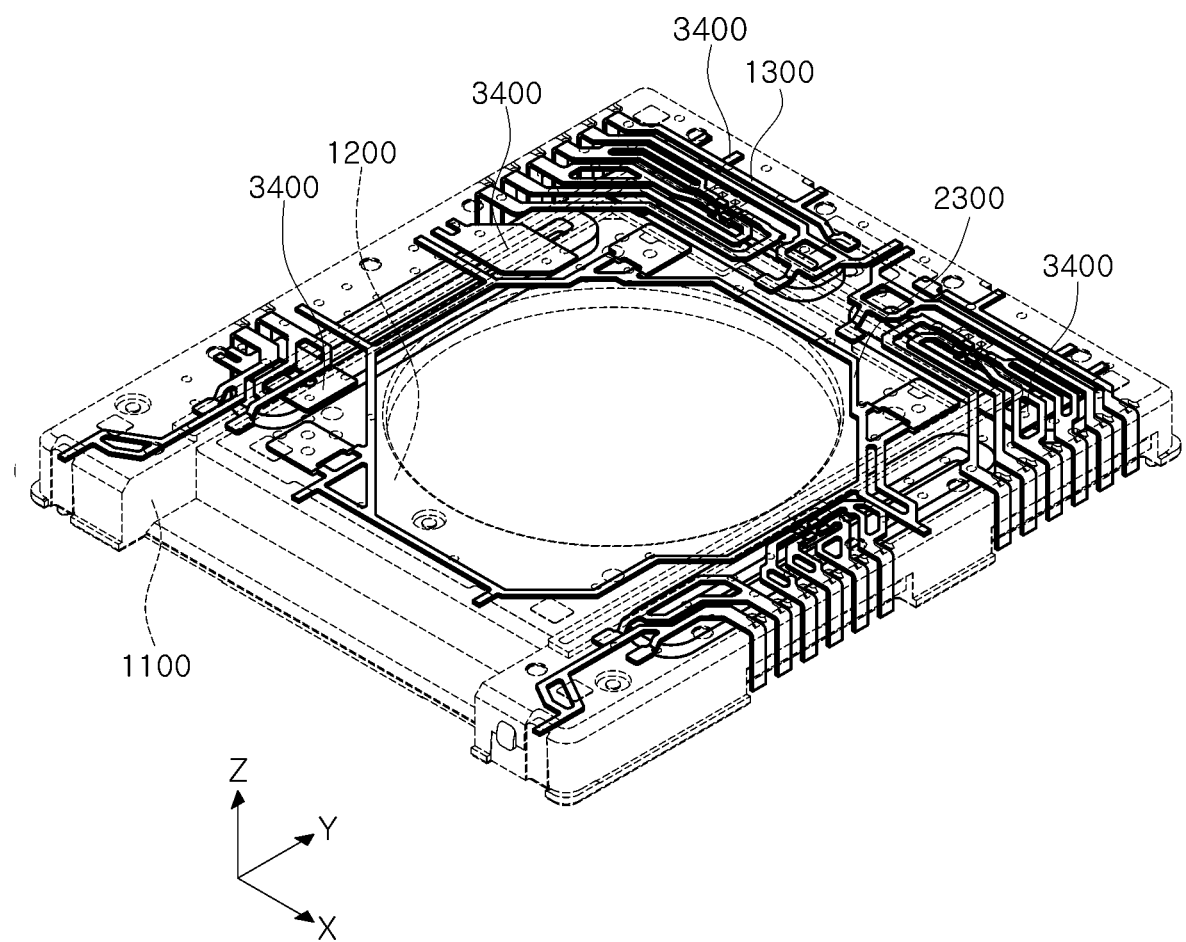
FIG. 14 is a perspective view illustrating a wiring pattern, a support pad, and a yoke unit embedded in the fixed frame.
Figure 15:
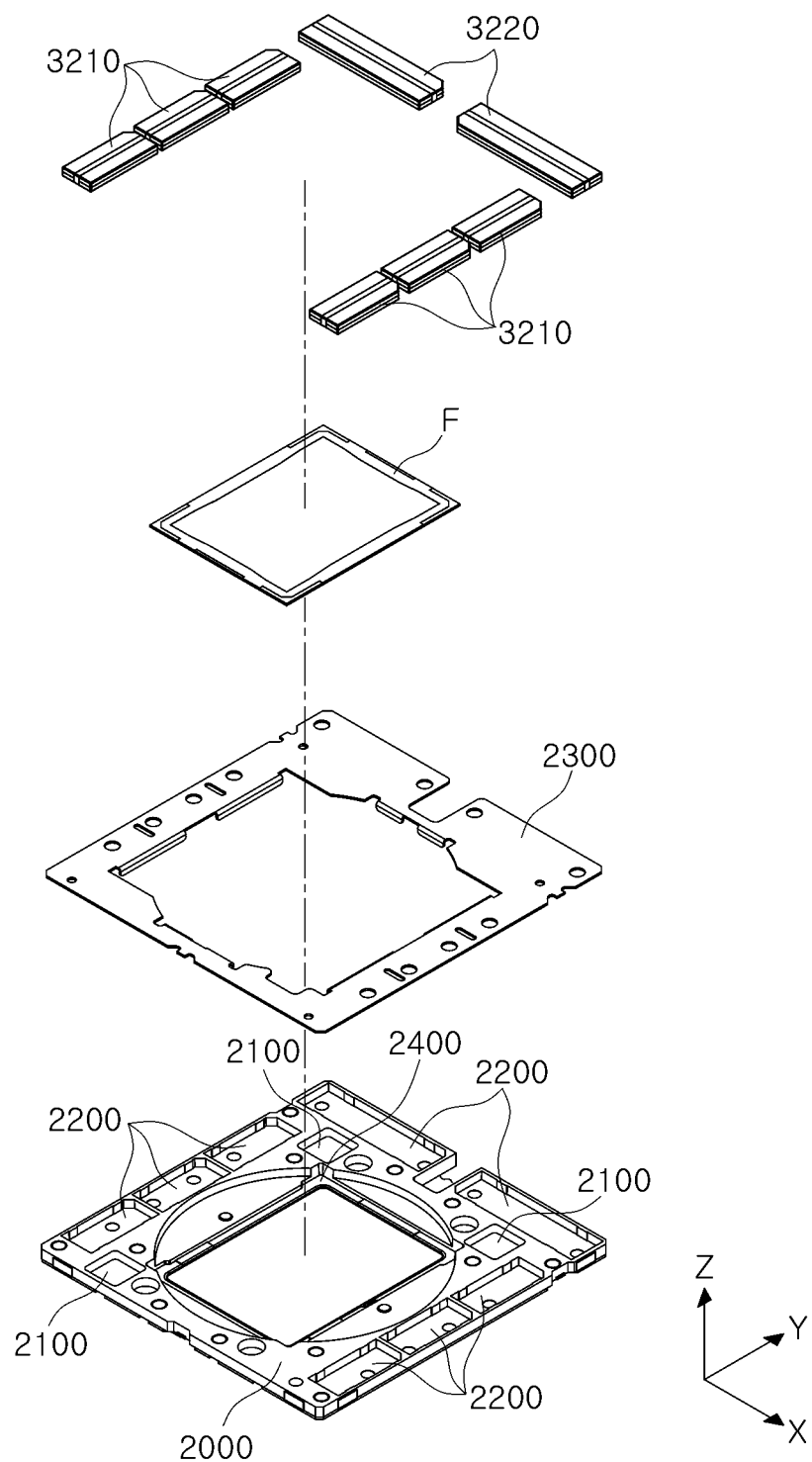
FIG. 15 is an exploded perspective view of a moving frame of the second module.
Figure 16:
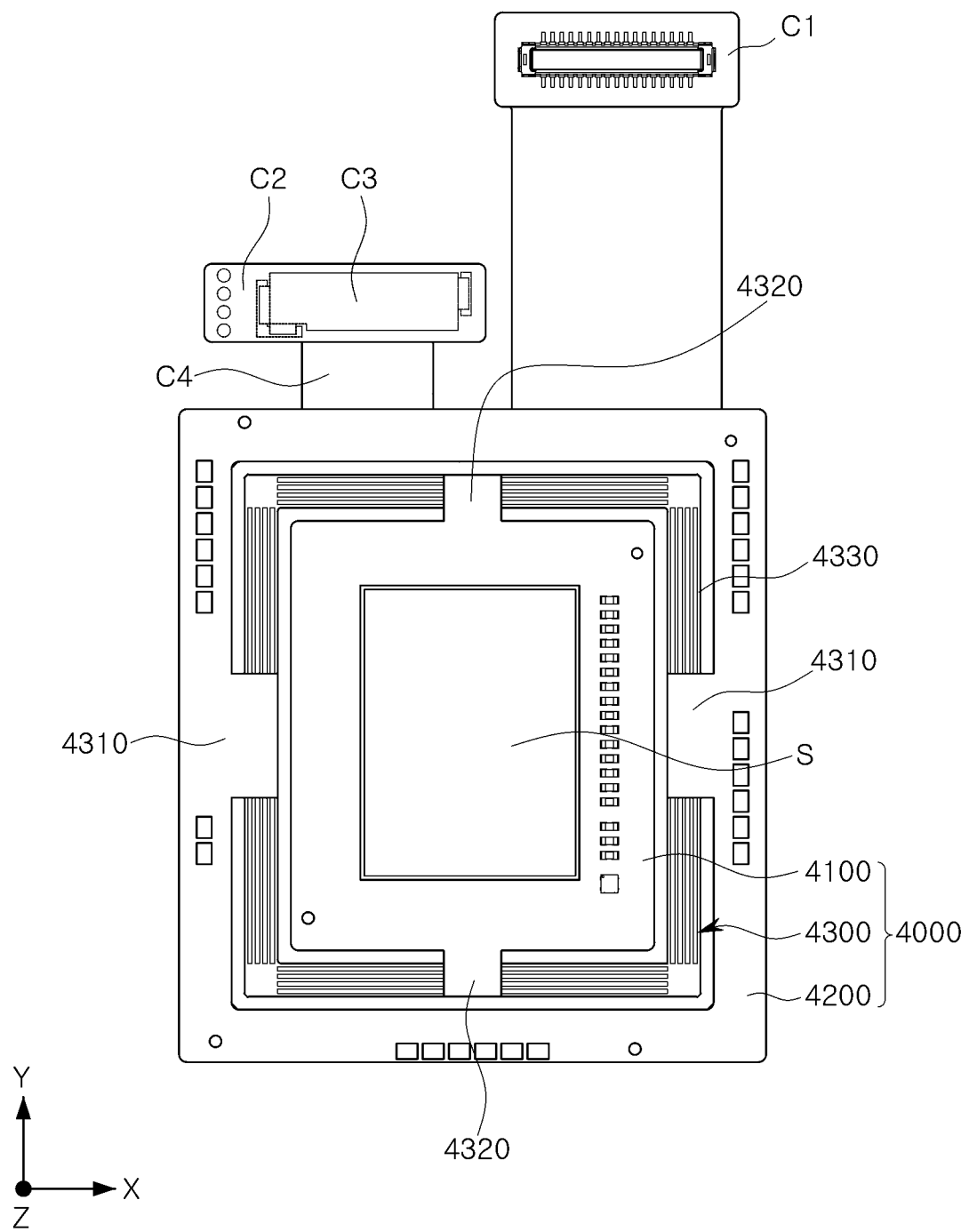
FIG. 16 is a plan view of a sensor substrate of the second module.
Figure 17:
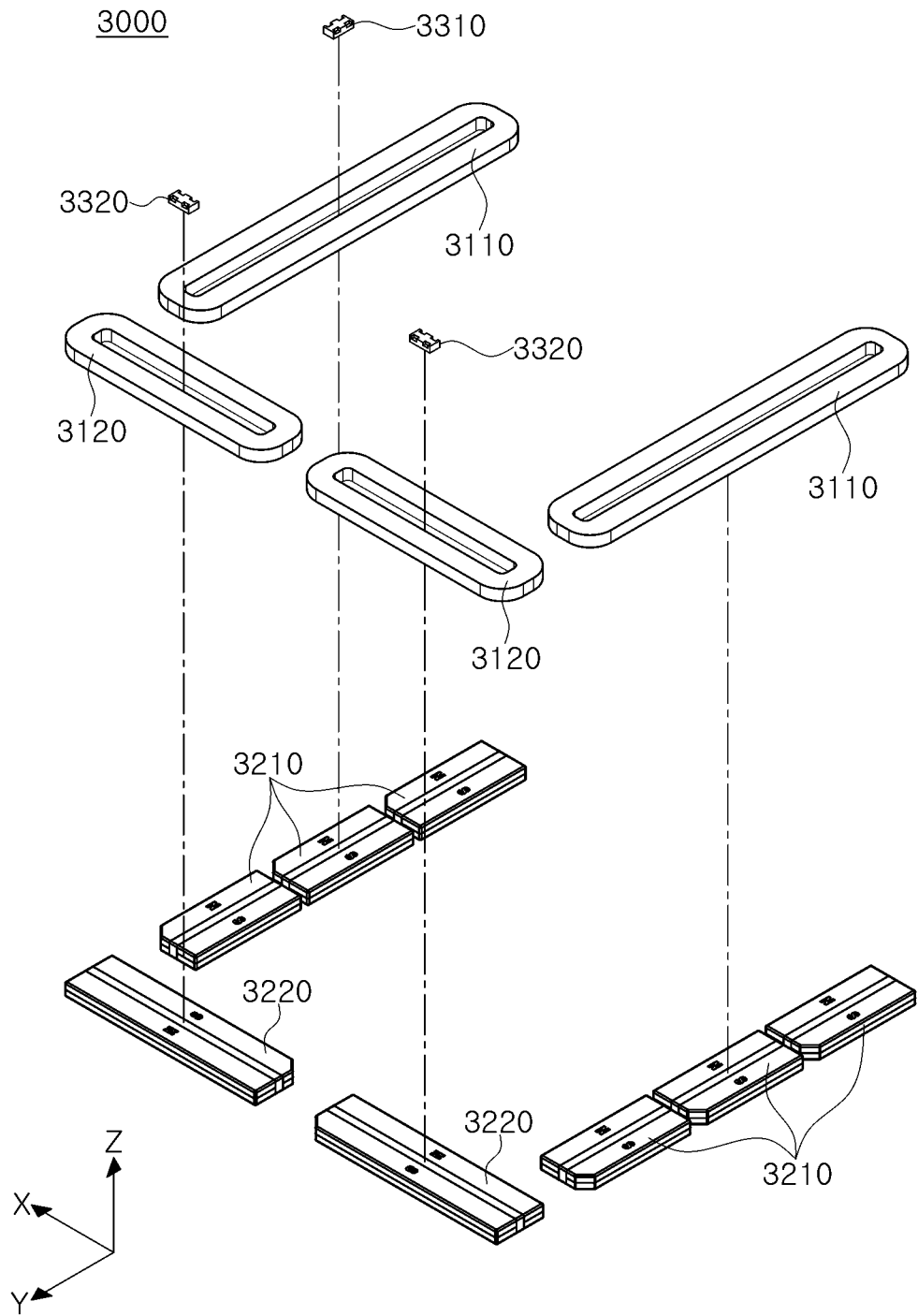
FIG. 17 is an example arrangement view of a second driving unit of the second module.

FIG. 11 is an exploded perspective view of the second module of FIG. 2. FIG. 12 is a perspective view of a fixed frame included in the second module. FIG. 13 is an exploded bottom perspective view of the fixed frame included in the second module. FIG. 14 is a perspective view illustrating a wiring pattern, a support pad, and a yoke unit embedded in the fixed frame. FIG. 15 is an exploded perspective view of a moving frame included in the second module. FIG. 16 is a plan view of a sensor substrate included in the second module. FIG. 17 is an example arrangement view of a second driving unit included in the second module.

Since the camera module 1 shown in FIGS. 11 to 17 includes all of the features of the camera module 1 described above with reference to FIGS. 1 to 10, a redundant description thereof may be omitted.

The second module 20 may include the image sensor S on which light passing through the lens unit 30 in FIG. 2 supported by the first module 10 in FIGS. 2 to 10 is incident. The second module 20 may perform optical image stabilization by moving the image sensor S in a direction different from the optical axis direction (e.g., the Z-axis direction).

The second module 20 may include a fixed frame 1000, a moving frame 2000, a first driving unit 3000, and a sensor substrate 4000, and may further include a base 5000.

The fixed frame 1000 may be coupled to the first module 10. For example, the fixed frame 1000 may be coupled to the housing 100 of the first module 10. The housing 100 of the first module 10 may be seated and coupled to an upper surface of the fixed frame 1000.

Since the extension 220 of the lens holder 200 and the first accommodating portion 120 of the housing 200 protrude in the optical axis direction (Z-axis direction), a clearance space may be provided in the fixed frame 1000 in order to secure an installation space for the extension 220 and the first accommodating portion 120.

For example, as illustrated in FIGS. 11 and 12, a second accommodating portion 1110 may be disposed on one side of the fixed frame 1000 to provide a receiving space in which the first accommodating portion 120 of the housing 200 may be disposed.

The second accommodating portion 1110 may be positioned below other parts of the fixed frame 1000 in the optical axis direction (Z-axis direction). For example, the second accommodating portion 1110 may be positioned below a seating portion 1210 on which the lower surface 110 of the housing 100 is seated in the fixed frame 1000 in the optical axis direction. That is, the distance in the optical axis direction between the second accommodating portion 1110 and the base 5000 may be shorter than the distance in the optical axis direction between the seating portion 1210 and the base 5000. According to this structure, a step portion 1120 may be formed between the second accommodating portion 1110 and the seating portion 1210.

The extension 220 of the lens holder 200 and the first accommodating portion 120 of the housing 200 may face the step portion 1120 in a direction (e.g., Y-axis direction) perpendicular to the optical axis direction (Z-axis direction).

An installation space for the extension 220 of the lens holder 200 and the first accommodating portion 120 of the housing 200 may be secured by the second accommodating portion 1110. Therefore, even if the extension 220 of the lens holder 200 and the first accommodating portion 120 of the housing 200 protrude in the optical axis direction (Z-axis direction), the protruding portion is disposed within the clearance space of the fixed frame 1000, so it is consequently possible to keep the height of the entire camera module 1 slim.

The fixed frame 1000 may be a fixed member that is not moved during focus adjustment and optical image stabilization. The moving frame 2000 may be a moving member that is moved during optical image stabilization.

The moving frame 2000 may be accommodated in the fixed frame 1000. The fixed frame 1000 has a sidewall extending downward in the optical axis direction (Z-axis direction), and thus the fixed frame 1000 may have a receiving space for receiving the moving frame 2000.

In the second module 20, the fixed frame 1000 may be a housing that provides an internal space in which the moving frame 2000, the first driving unit 3000, and the sensor substrate 4000 are accommodated. In order to distinguish the fixed frame 1000 from the housing 100 of the first module 10, in the following description, the housing 100 of the first module 10 may be referred to as a first housing, and the fixed frame 1000 of the second module 20 may be referred to as a second housing.

The moving frame 2000 may be moved in a direction perpendicular to the optical axis direction (Z-axis direction) with respect to the fixed frame 1000, or may be rotated about the optical axis (Z-axis) or a rotation axis parallel to the optical axis (Z-axis).

For example, the moving frame 2000 is configured to be movable in the first direction (Y-axis direction) and the second direction (X-axis direction), and may be rotated about the optical axis (Z-axis) or a rotation axis parallel to the optical axis (Z-axis).

The first direction (Y-axis direction) may be a direction perpendicular to the optical axis direction (Z-axis direction), and the second direction (X-axis direction) may be a direction perpendicular to both the optical axis direction (Z-axis direction) and the first direction (Y-axis direction).

The fixed frame 1000 and the moving frame 2000 may each have an opening penetrating therethrough in the optical axis direction (Z-axis direction), and the light passing through the lens unit 30 may be incident on the image sensor S through the openings.

An optical filter F may be disposed on the upper portion of the moving frame 2000. For example, the optical filter F may be an infrared cut filter. A first mounting groove 2400 in which the optical filter F is mounted may be provided on an upper portion of the moving frame 2000. The sensor substrate 4000 may be mounted on a lower surface of the moving frame 2000.

A second ball unit 3500 may be disposed between the fixed frame 1000 and the moving frame 2000.

The second ball unit 3500 may be disposed to be in contact with the fixed frame 1000 and the moving frame 2000.

When the moving frame 2000 is moved or is rotated with respect to the fixed frame 1000, the second ball unit 3500 may be rolled between the fixed frame 1000 and the moving frame 2000 to support the movement of the moving frame 2000.

Since the second ball unit 3500 is provided, the moving frame 2000 may be easily moved in the first direction (Y-axis direction) and the second direction (X-axis direction) while maintaining a predetermined spacing from the fixed frame 1000.

Since the moving frame 2000 is accommodated in the fixed frame 1000, it is necessary to reduce the thickness of the moving frame 2000 in order to reduce the height of the second module 20 in the optical axis direction (Z-axis direction). However, when the thickness of the moving frame 2000 is reduced, the stiffness of the moving frame 2000 may be weakened, thereby reducing a reliability of the moving frame 2000 against external shocks or other disturbances.

Accordingly, a reinforcing plate 2300 may be provided in the moving frame 2000 to reinforce the stiffness of the moving frame 2000. The reinforcing plate 2300 may be made of a material having a higher stiffness than a material constituting the moving frame 2000. For example, the reinforcing plate 2300 may be made of a stainless steel material.

As an example, referring to FIG. 15, the reinforcing plate 2300 may be integrally formed with the moving frame 2000 by insert injection molding. In this case, the reinforcing plate 2300 may be manufactured to be integrated with the moving frame 2000 by injecting a resin material into a mold in a state in which the reinforcing plate 2300 is fixed in the mold.

The reinforcing plate 2300 may be disposed inside the moving frame 2000. The reinforcing plate 2300 may be partially exposed to the outside of the moving frame 2000. In this way, by partially exposing the reinforcing plate 2300 to the outside of the moving frame 2000 while integrally forming the reinforcing plate 2300 with the moving frame 2000 inside the moving frame 2000, it is possible to improve a coupling force between the reinforcing plate 2300 and the moving frame 2000, and prevent the reinforcing plate 2300 from being separated from the moving frame 2000.

The image sensor S may be mounted on the sensor substrate 4000. A portion of the sensor substrate 4000 may be coupled to the moving frame 2000, and another portion of the sensor substrate 4000 may be coupled to the fixed frame 1000.

The image sensor S may be mounted on a portion of the sensor substrate 4000 coupled to the moving frame 2000.

Since a portion of the sensor substrate 4000 is coupled to the moving frame 2000, as the moving frame 2000 is moved or rotated, the portion of the sensor substrate 4000 that is coupled to the moving frame 2000 may also be moved or rotated together with the moving frame 2000. That is, since a portion of the sensor substrate 4000 is coupled to the moving frame 2000 and the image sensor S is disposed on the portion of the sensor substrate 4000 that is coupled to the moving frame 2000, as the moving frame 2000 is moved or rotated, the image sensor S may also be moved or rotated.

Accordingly, the image sensor S may be moved on a plane perpendicular to the optical axis (Z-axis) direction or rotated about the optical axis (Z-axis) or a rotation axis parallel to the optical axis (Z-axis) to perform optical image stabilization at the time of capturing an image.

The second driving unit 3000 may generate a driving force in the direction perpendicular to the optical axis direction (Z-axis direction) to move the moving frame 2000 in the direction perpendicular to the optical axis direction (Z-axis direction) or rotate the moving frame 2000 about the optical axis (Z-axis) or a rotation axis parallel to the optical axis (Z-axis).

The second driving unit 3000 may include a first sub-driving unit and a second sub-driving unit. The first sub-driving unit may generate a driving force in the second direction (X-axis direction), and the second sub-driving unit may generate a driving force in the first direction (Y-axis direction).

The first sub-driving unit may include a second driving magnet 3210 and a second driving coil 3110. The second driving magnet 3210 and the second driving coil 3110 may be disposed to face each other in the optical axis direction (Z-axis direction).

The second driving magnet 3210 may be fixed to the moving frame 2000. The second driving magnet 3210 may include a plurality of magnets. For example, the second driving magnet 3210 may include a set of magnets spaced apart from each other in the first direction (Y-axis direction) perpendicular to the second direction (X-axis direction) in which a driving force is generated by the second driving magnet 3210. The second driving magnet 3210 may include a plurality of sets of magnets spaced apart from each other in the second direction (X-axis direction), and at least two magnets may be included in each set.

It is also possible to use one magnet having a long shape in the first direction (Y-axis direction), but when the magnet has a shape that is too long in one direction, there may be a risk that the magnet is damaged during manufacturing. Accordingly, it is possible to improve a reliability during manufacturing by arranging a plurality of magnets spaced apart from each other along a longitudinal direction as a set.

Second mounting grooves 2200 in which the second driving magnet 3210 is disposed may be formed in an upper portion of the moving frame 2000. By inserting the second driving magnet 3210 into the second mounting grooves 2200, it is possible to prevent the heights of the second module 20 and the camera module 1 from increasing due to the thickness of the second driving magnet 3210.

The second driving magnet 3210 may be magnetized so that one surface (e.g., a surface facing the second driving coil 3110) has both an N-pole and an S-pole. For example, the N-pole, a neutral region, and the S-pole may be sequentially arranged in the second direction (X-axis direction) on the one surface of the second driving magnet 3210 facing the second driving coil 3110.

In addition, the other surface (e.g., an opposite surface to the one surface) of the second driving magnet 3210 may be magnetized to have a polarity opposite to the polarity of the one surface. For example, an S-pole, a neutral region, and an N-pole may be sequentially arranged in the second direction (X-axis direction) on the other surface of the second driving magnet 3210.

The magnetization directions of the sets of magnets included in the second driving magnet 3210 may all be the same.

The second driving coil 3110 may be disposed to face the second driving magnet 3210. For example, the second driving magnet 3110 may be disposed to face the second driving coil 3110 in the optical axis direction (Z-axis direction).

The second driving coil 3110 may have a hollow donut shape that is elongated in the first direction (Y-axis direction). The second driving coil 3110 may include a smaller number of coils than the number of magnets included in the second driving magnet 3210. For example, the second driving coil 3110 may include two coils spaced apart from each other in the second direction (X-axis direction) in which a driving force is generated, and each coil may be disposed to face each set of magnets of the second driving magnet 3210.

The second driving magnet 3210 may be a moving member that is mounted on the moving frame 2000 and moved together with the moving frame 2000, and the second driving coil 3110 may be a fixed member fixed to the fixed frame 1000.

When power is applied to the second driving coil 3110, a driving force for moving the moving frame 2000 in the second direction (X-axis direction) may be generated by an electromagnetic force between the second driving magnet 3210 and the second driving coil 3110.

The second sub-driving unit may include a third driving magnet 3220 and a third driving coil 3120. The third driving magnet 3220 and the third driving coil 3120 may be disposed to face each other in the optical axis direction (Z-axis direction).

The third driving magnet 3220 may be disposed on the moving frame 2000. The third driving magnet 3220 may include a plurality of magnets. For example, the third magnet 3220 may include two magnets, and the two magnets may be spaced apart from each other along the second direction (X-axis direction). For example, the third driving magnet 3220 may include two magnets disposed to be spaced apart from each other in the second direction (X-axis direction) perpendicular to the first direction (Y-axis direction in which a driving force is generated by the third driving magnet 3220.

Second mounting grooves 2200 in which the third driving magnet 3220 is disposed may be formed in an the upper portion of the moving frame 2000. By inserting the third driving magnet 3220 into the second mounting grooves 2200, it is possible to prevent the heights of the second module 20 and the camera module 1 from increasing due to the thickness of the third driving magnet 3220.

The third driving magnet 3220 may be magnetized so that one surface (e.g., a surface facing the third driving coil 3120) has both an S-pole and an N-pole. For example, the S-pole, a neutral region, and the N-pole may be sequentially arranged in the first direction (Y-axis direction) on the one surface of the third driving magnet 3220 facing the third driving coil 3120. The other surface (e.g., an opposite surface to the one surface) of the third driving magnet 3220 may be magnetized to have a polarity opposite to that of one surface. For example, an N-pole, a neutral region, and an S-pole may be sequentially in the first direction (Y-axis direction) on the other surface of the third driving magnet 3220.

The magnetization directions of the two magnets included in the third driving magnet 3220 may be opposite to each other.

The third driving coil 3120 may be disposed to face the third driving magnet 3220. For example, the third driving coil 3120 may be disposed to face the third driving magnet 3220 in the optical axis direction (Z-axis direction).

The third driving coil 3120 may have a hollow donut shape that is elongated in the second direction (X-axis direction). The third driving coil 3120 may include a number of coils corresponding to the number of magnets included in the third driving magnet 3220. For example, the third driving coil 3120 may include two coils corresponding to the two magnets included in the third driving magnet 3220.

The third driving magnet 3220 may be a moving member that is mounted on the moving frame 2000 and moved together with the moving frame 2000, and the third driving coil 3120 may be a fixed member fixed to the fixed frame 1000.

When power is applied to the third driving coil 3120, a driving force for moving the moving frame 2000 in the first direction (Y-axis direction) may be generated by an electromagnetic force between the third driving magnet 3220 and the third driving coil 3120.

A driving force generated by the first sub-driving unit and the second sub-driving unit may be combined with each other to rotate the moving frame 2000. For example, by controlling a driving force of the first sub-driving unit and a driving force of the second sub-driving unit, a torque about the optical axis (Z-axis) or a rotation axis parallel to the optical axis (Z-axis) may be generated so the moving frame 2000 may be rotated.

The second driving magnet 3210 and the third driving magnet 3220 may be disposed perpendicular to each other in a plane perpendicular to the optical axis direction (Z-axis direction), and the second driving coil 3110 and the third driving coil 3120 may also be disposed perpendicular to each other in a plane perpendicular to the optical axis direction (Z-axis direction). That is, an angle between the second driving magnet 3210 and the third driving magnet 3220 may be approximately 90°, and an angle between the second driving coil 3110 and the third driving coil 3120 may be approximately 90°.

A second ball unit 3500 may be disposed between the fixed frame 1000 and the moving frame 2000. The second ball unit 3500 may include a plurality of balls disposed between the fixed frame 1000 and the moving frame 2000. The second ball unit 3500 may be disposed to be in contact with the fixed frame 1000 and the moving frame 2000. The second ball unit 3500 may serve to guide the movement of the moving frame 2000 during the optical image stabilization process. In addition, the second ball unit 3500 may serve to maintain a spacing between the fixed frame 1000 and the moving frame 2000.

The second ball unit 3500 may be rolled in the first direction (Y-axis direction) when a driving force is generated in the first direction (Y-axis direction). Accordingly, the second ball unit 3500 may guide the movement of the moving frame 2000 in the first direction (Y-axis direction).

In addition, the second ball unit 3500 may be rolled in the second direction (X-axis direction) when a driving force is generated in the second direction (X-axis direction). Accordingly, the second ball unit 3500 may guide the movement of the moving frame 2000 in the second direction (X-axis direction).

Surfaces of the fixed frame 1000 and the moving frame 2000 facing each other in the optical axis direction (Z-axis direction) may be provided with guide grooves 1220 and 2100 in which the second ball unit 3500 is disposed. A plurality of guide grooves 1220 and 2100 may be provided to correspond to the plurality of balls of the second ball unit 3500.

For example, fifth guide grooves 1220 may be formed in the lower surface of the fixed frame 1000, and sixth guide grooves 2100 may be formed in the upper surface of the moving frame 2000.

The second ball unit 3500 may be disposed in the fifth guide grooves 1220 and the sixth guide grooves 2100 to be fitted between the fixed frame 1000 and the moving frame 2000.

Each of the fifth guide grooves 1220 and the sixth guide grooves 2100 may have a polygonal or circular planar shape. The sizes of the fifth guide grooves 1220 and the sixth guide grooves 2100 may be greater than a diameter of the balls of the second ball unit 3500. For example, cross sections of the fifth guide grooves 1220 and the sixth guide grooves 2100 in planes perpendicular to the optical axis (Z-axis) may have sizes greater than the diameter of the balls of the second ball unit 3500. Specific shapes of the fifth guide grooves 1220 and the sixth guide grooves 2100 are not limited as long as the sizes of the fifth guide grooves 1220 and the sixth guide grooves 2100 are greater than the diameter of the balls of the second ball unit 3500. Accordingly, the second ball unit 3500 may be rolled in the direction perpendicular to the optical axis direction (Z-axis direction) in a state in which the second ball unit 3500 is disposed in the fifth guide grooves 1220 and the sixth guide grooves 2100.

A portion of the reinforcing plate 2300 may be exposed to the outside through the upper surface of the moving frame 2000. Portions of the reinforcing plate 2300 exposed to the outside may form a bottom surface of the sixth guide grooves 2100. Accordingly, the second ball unit 3500 may be rolled in contact with the reinforcing plate 2300.

The second driving unit 3000 of the second module 20 may include position sensors 3310 and 3320 capable of detecting the position of the moving frame 2000 in the direction perpendicular to the optical axis direction (Z-axis direction).

To this end, a second position sensor 3310 and a third position sensor 3320 may be provided. The second position sensor 3310 may be disposed on the fixed frame 1000 to face the second driving magnet 3210, and the third position sensor 3320 may be disposed on the fixed substrate 1000 to face the third driving magnet 3220. The second position sensor 3310 and the third position sensor 3320 may be Hall sensors.

The third position sensor 3320 may include two Hall sensors. For example, the third driving magnet 3220 may include two magnets spaced apart from each other in the second direction (X-axis direction) perpendicular to the first direction (Y-axis direction) in which a driving force is generated by the third driving magnet 3220, and the third position sensor 3320 may include two Hall sensors disposed to face the two magnets of the third driving magnet 3220.

Whether the moving frame 2000 has been rotated may be detecting using the two Hall sensors of the third position sensor 3320 facing the third driving magnet 3220.

A torque about the optical axis (Z-axis) may be intentionally generated by generating a deviation between a driving force of the first sub driving unit and a driving force of the second sub driving unit, using a resultant force of the first sub driving unit and the second sub driving unit, using two magnets and two coils included in the second sub-driving unit, or using other techniques.

Since the fifth guide grooves 1220 and the sixth guide grooves 2100 have a polygonal or circular shape having a size larger than the diameter of the balls of the second ball unit 3500, the second ball unit 3500 disposed between the fifth guide grooves 1220 and the sixth guide grooves 2100 may be rolled in any direction perpendicular to the optical axis direction (Z-axis direction) without limitation.

Accordingly, the moving frame 2000 may be rotated about the optical axis (Z-axis) or a rotation axis parallel to the optical axis (Z-axis) while being supported by the second ball unit 3500.

In addition, when no rotation about the optical axis (Z-axis) or a rotation axis parallel to the optical axis (Z-axis) is required but linear movement is required, any torque about the optical axis (Z-axis) or a rotation axis parallel to the optical axis (Z-axis) that is unintentionally generated may be offset by controlling a driving force of the first sub-driving unit and/or a driving force of the second sub-driving unit.

Referring to FIGS. 13 and 14, the fixed frame 1000 includes a wiring pattern 1300 embedded herein, and the wiring pattern 1300 may be connected to the second driving coil 3110 and the third driving coil 3120. Also, the wiring pattern 1300 of the fixed frame 1000 may be connected to the sensor substrate 4000. Accordingly, the second driving coil 3110 and the third driving coil 3120 may be supplied with power through the wiring pattern 1300 embedded in the fixed frame 1000.

That is, the camera module 1 may include the wiring pattern 1300 embedded in the fixed frame 1000 itself without a separate printed circuit board for supplying power to the second driving unit 3000 to provide power to the second driving unit 3000.

The wiring pattern 1300 may be embedded in the fixed frame 1000 by insert injection molding. For example, by injecting a resin material into a mold while the wiring pattern 1300 is disposed in the mold, the wiring pattern 1300 may be embedded in the fixed frame 1000.

The camera module 1 according to the example embodiments may undergo insert injection molding at least twice during the manufacturing of the fixed frame 1000.

When a pattern width of the wiring pattern 1300 is minimized to reduce the size, the stiffness of the wiring pattern 1300 is not sufficient, so that it may be difficult to fix the position of the wiring pattern 1300 during the insert injection molding. Therefore, a primary injection molding product, i.e., a first frame 1200 integrated with the wiring pattern 1300, is manufactured by insert injection molding, and then the primary injection molding product is subjected to insert injection molding to form a secondary injection molding product i.e., a second frame 100 integrated with the primary injection molding product, so the fixed frame 1000 having the wiring pattern 1300 embedded therein may be manufactured.

The wiring pattern 1300 may include a wiring unit 1310 and a terminal unit 1320, the wiring unit 1310 may be embedded inside the first frame 1200, and the terminal unit 1320 may be exposed to the outside of the first frame 1200. Also, the terminal unit 1320 may be exposed to the outside of the second frame 1100. The terminal unit 1320 of the wiring pattern 1300 may be connected to the sensor substrate 4000, so power may be applied to the second driving coil 3110 and the third driving coil 3120 through the wiring pattern 1300.

The fifth guide grooves 1220 in which the second ball unit 3500 is disposed may be formed in the first frame 1200. Since the material of the balls of the second ball unit 3500 may be ceramic and the material of the first frame 1200 is plastic, there is a risk that the fifth guide grooves 1220 may be damaged due to the difference in stiffness between the ceramic and the plastic.

Accordingly, in order to prevent damage to the fifth guide grooves 1220, support pad unit 1500 may be disposed to form bottom surfaces of the fifth guide grooves 1220, and the support pad unit 1500 may be insert injection molded in the same manner as the wiring pattern 1300 in the primary insert injection molding process discussed above to be integrated with the first frame 1200. The support pad unit 1500 may be made of a stainless steel material.

A portion of the support pad unit 1500 may be embedded in the first frame 1200, and another portion of the support pad unit 1500 may be exposed to the outside of the first frame 1200.

The portion of the support pad unit 1500 exposed to the outside of the first frame 1200 may form the bottom surfaces of the fifth guide grooves 1220. Accordingly, the second ball unit 3500 may be rolled in contact with the support pad unit 1500.

A second yoke unit 3400 may be embedded in the fixed frame 1000. The second yoke unit 3400 enables a magnetic attraction with the moving frame 2000 to be generated so that the fixed frame 1000 and the moving frame 2000 may maintain a contact state with the second ball unit 3500.

The second yoke unit 3400 may be insert injection molded in the same manner as the wiring pattern 1300 in the primary injection molding process discussed above to be integrated with the first frame 1200.

The second yoke unit 3400 may be disposed to face the second driving magnet 3210 and the third driving magnet 3220 in the optical axis direction (Z-axis direction) so that a magnetic attraction may act between the second yoke unit 3400 and the second driving magnet 3210 and between the second yoke unit 3400 and the third driving magnet 3220. The second yoke unit 3400 includes a plurality of yokes. For example, the yoke unit may include two yokes facing the two magnets included in the third driving magnet 3220 and two yokes facing one of the two sets of magnets included in the second driving magnet 3210.

The number of yokes in the second yoke unit 3400 is not limited to four, but a support center point of the magnetic attraction acting between the second yoke unit 3400 and the second driving magnet 3210 and between the second yoke unit 3400 and the third driving magnet 3220 may be positioned within a support area defined by lines connecting centers of the plurality of balls included in the second ball unit 3500 to each other.

The magnetic attraction acts in the optical axis direction (Z-axis direction) between the second yoke unit 3400 and the second driving magnet 3210 and between the second yoke unit 3400 and the third driving magnet 3220.

Accordingly, since the moving frame 2000 is pressed by the magnetic attraction in a direction toward the fixed frame 1000, the fixed frame 1000 and the moving frame 2000 may maintain a contact state with the second ball unit 3500.

The second yoke unit 3400 may be made of a material capable of generating a magnetic attraction with the second driving magnet 3210 and the third driving magnet 3220. For example, the second yoke unit 3400 may be made of a magnetic material.

The fixed frame 1000 may further include a shield can 1400. The shield can 1400 may cover at least a portion of an upper surface and a side surface of the second frame 1100 that is a secondary injection molding product. The shield can 1400 may serve to shield electromagnetic waves.

Referring to FIG. 16, the sensor substrate 4000 may include a moving part 4100, a fixed part 4200, and a connection part 4300. The sensor substrate 4000 may be a rigid flexible printed circuit board (RF PCB).

The image sensor S is mounted on the moving part 4100. The moving part 4100 is coupled to the lower surface of the moving frame 2000. For example, an area of the moving part 4100 may be greater than an area of the image sensor S, and a portion of the moving part 4100 surrounding the image sensor S may be coupled to the lower surface of the moving frame 2000.

The moving part 4100 may be a moving member that is moved together with the moving frame 2000 during optical image stabilization. The moving part 4100 may be a rigid PCB.

The fixed part 4200 may be coupled to the lower surface of the fixed frame 1000. The fixed part 4200 may be a fixed member that does not move during optical image stabilization. The fixed part 4200 may be a rigid PCB.

The connection part 4300 may be disposed between the moving part 4100 and the fixed part 4200, and may connect the moving part 4100 and the fixed part 4200 to each other. The connection part 4300 may be a flexible PCB. When the moving part 4100 is moved, at least a portion of the connection part 4300 disposed between the moving part 4100 and the fixed part 4200 may be bent.

The connection part 4300 extends along a circumference of the moving part 4100. The connection part 4300 may include a plurality of slits penetrating through the connection part 4300 in the optical axis direction. The plurality of slits may be disposed at intervals between the moving part 4100 and the fixed part 4200. Accordingly, the connection part 4300 may include a plurality of bridge elements 4330 spaced apart from each other by the plurality of slits. The plurality of bridge elements 4330 may extend along the circumference of the moving part 4100.

The connection part 4300 may include a first support part 4310 and a second support part 4320. The connection part 4300 may be connected to the fixed part 4200 through the first support part 4310. In addition, the connection part 4300 may be connected to the moving part 4100 through the second support part 4320.

For example, the first support part 4310 may be in contact with and connected to the fixed part 4200, and may be spaced apart from the moving part 4100. The second support part 4320 may be in contact with and connected to the moving part 4100, and may be spaced apart from the fixed part 4200.

For example, the first support part 4310 may extend in the second direction (X-axis direction) to connect the plurality of bridge elements 4330 of the connection part 4300 and the fixed part 4200 to each other. In an example embodiment, the first support part 4310 may include two support parts disposed on opposite sides of the moving part 4100 in the second direction (X-axis direction).

The second support part 4320 may extend in the first direction (Y-axis direction) to connect the plurality of bridge elements 4330 of the connection part 4300 and the moving part 4100 to each other. In an example embodiment, the second support part 4320 may include two support parts disposed on opposite sides the moving part 4100 in the first direction (Y-axis direction).

Accordingly, the moving part 4100 may be moved in the direction perpendicular to the optical axis direction (Z-axis direction) or rotated about the optical axis (Z-axis) or a rotation axis parallel to the optical axis (Z-axis) while being supported by the connection part 4300.

In an example embodiment, when the image sensor S is moved in the first direction (Y-axis direction), the plurality of bridge elements 4330 connected to the first support part 4310 may be bent. In addition, when the image sensor S is moved in the second direction (X-axis direction), the plurality of bridge elements 4330 connected to the second support part 4320 may be bent. In addition, when the image sensor S is rotated, the plurality of bridge elements 4330 connected to the first support part 4310 and the plurality of bridge elements 4330 connected to the second support part 4320 may be bent together.

In example embodiments, the length in the first direction (Y-axis direction) and the length in the second direction (X-axis direction) of the fixed part 4200 may be different from each other. For example, the length in the second direction (X-axis direction) of the fixed part 4200 may be shorter than the length in the first direction (Y-axis direction).

In example embodiments, the sensor substrate 4000 may have an overall rectangular shape. In the sensor substrate 4000 of this type, when the length of the first support part 4310 and the length of the second support part 4320 are equal to each other, a load applied to the plurality of bridge elements 4330 connected to the first support part 4310 and a load applied to the plurality of bridge elements 4330 connected to the second support part 4320 are different, and accordingly, it may be difficult to control the driving.

Accordingly, by making the length of the first support part 4310 and the length of the second support part 4320 different from each other, the lengths of the plurality of bridge elements 4330 extending in the first direction (Y-axis direction) from the first support part 4310 and the lengths of the plurality of bridge elements 4330 extending in the second direction (X-axis direction) from the second support part 4320 may be approximately equal to each other. Here, the length of the first support part 4310 may refer to the length in the first direction (Y-axis direction), and the length of the second support part 4320 may refer to the length in the second direction (X-axis direction).

A driver IC C3 for driving control of the second driving unit 3000 may be disposed on the sensor substrate 4000. The driver IC C3 may be disposed on a connection substrate C2, and the connection substrate C2 may be connected to the fixed part 4200 by a flexible PCB C4.

The driver IC C3 may be fixed to the upper surface of the fixed frame 1000 (e.g., the upper surface of the shield can 1400). That is, since the flexible circuit board C4 may be bent, the connection board C2 on which the driver IC C3 is disposed may be disposed on the upper surface of the fixed frame 1000. Therefore, since there is no need to secure a separate installation space, it is possible to reduce the overall size of the camera module 1.

In addition, a first connector C1 for connecting to an external power supply (e.g., a portable electronic device in which the camera module 1 is mounted) may be extended and disposed on the fixed part 4200 of the sensor substrate 4000.

A base 5000 may be coupled to a lower portion of the sensor substrate 4000. The base 5000 may be coupled to the lower portion of the sensor substrate 4000 so as to cover the lower portion of the sensor substrate 4000. The base 5000 may serve to prevent external foreign objects from being introduced through a space between the moving part 4100 and the fixed part 4200 of the sensor substrate 4000.

A heat dissipation film 5100 may be disposed below the base 5000, and the heat dissipation film 5100 may cover a lower portion of the base 5000 and a side surface of the second module 20. For example, the heat dissipation film 5100 may cover the lower surface of the base 5000 and, if necessary, may further cover at either one or both of the side surface of the sensor substrate 4000 and the side surface of the fixed frame 1000. Accordingly, heat generated by the image sensor S may be effectively dissipated.

In the second module 20, positions at which the driving coils 3110 and 3120 and the driving magnets 3210 and 3220 are disposed are not limited to the above description. For example, as illustrated in FIG. 18, the driving magnets 3210 and 3220 may be disposed on a fixed body, and the driving coils 3110 and 3120 may be disposed on a moving body.

Figure 18:
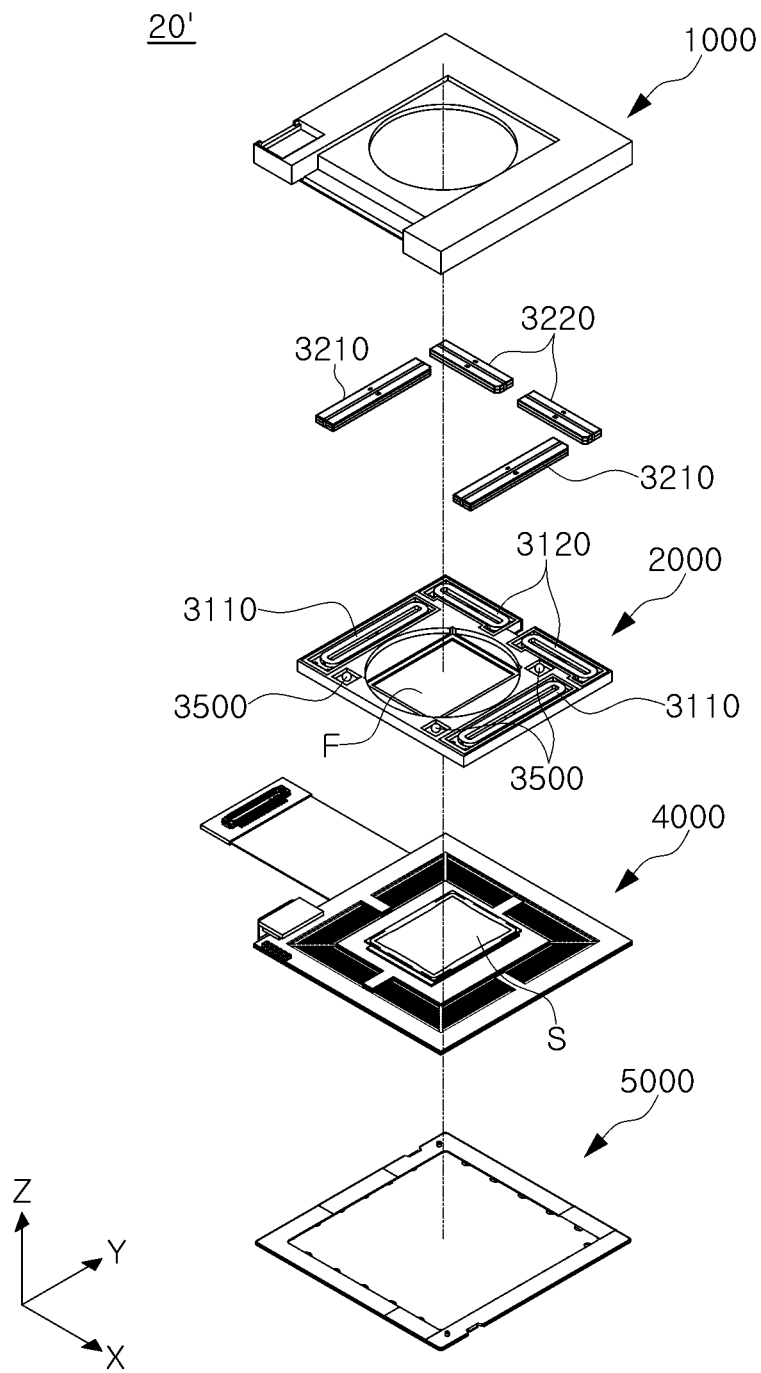
FIG. 18 is an exploded perspective view of a second module according to other example embodiments.

FIG. 18 is an exploded perspective view of a second module 20' according to other example embodiments. Referring to FIG. 18, the second driving magnet 3210 and the third driving magnet 3220 may be disposed in the fixed frame 1000, and the second driving coil 3110 and the third driving coil 3120 may be disposed in the moving frame 2000 movable with respect to the fixed frame 1000.

The second driving magnet 3210 and the third driving magnet 3220 may be disposed to face the second driving coil 3110 and the third driving coil 3120, respectively, in the optical axis direction (Z-axis direction).

Due to the electromagnetic interaction between the driving magnets 3210 and 3220 and the driving coils 3110 and 3120, the moving frame 2000 may move with respect to the fixed frame 1000. As the moving frame 2000 is moved, the image sensor S connected to the moving frame 2000 may be moved together with the moving frame 2000.

The driving coils 3110 and 3120 may be disposed on the upper surface of the moving frame 2000 facing the fixed frame 1000. The driving magnets 3210 and 3220 may be disposed on a surface facing the moving frame 2000 in the fixed frame 1000.

Since the driving coils 3110 and 3120 are disposed on the moving frame 2000, power may be supplied to the driving coils 3110 and 3120 through a wiring configuration connected to the image sensor S. Accordingly, since it is not necessary to configure a separate wiring pattern in the fixed frame 1000, the wiring structure of the second module 20' may be more simply configured than in the second module 20.

In the second module 20' shown in FIG. 18, it is to be noted that all features other than those described above may be the same as the features of the second module 20 shown in FIGS. 11 to 17.

Hereinafter, an arrangement relationship between the first module 10 and the second module 20 will be described in detail with reference to FIGS. 19 and 20.

Figure 19:
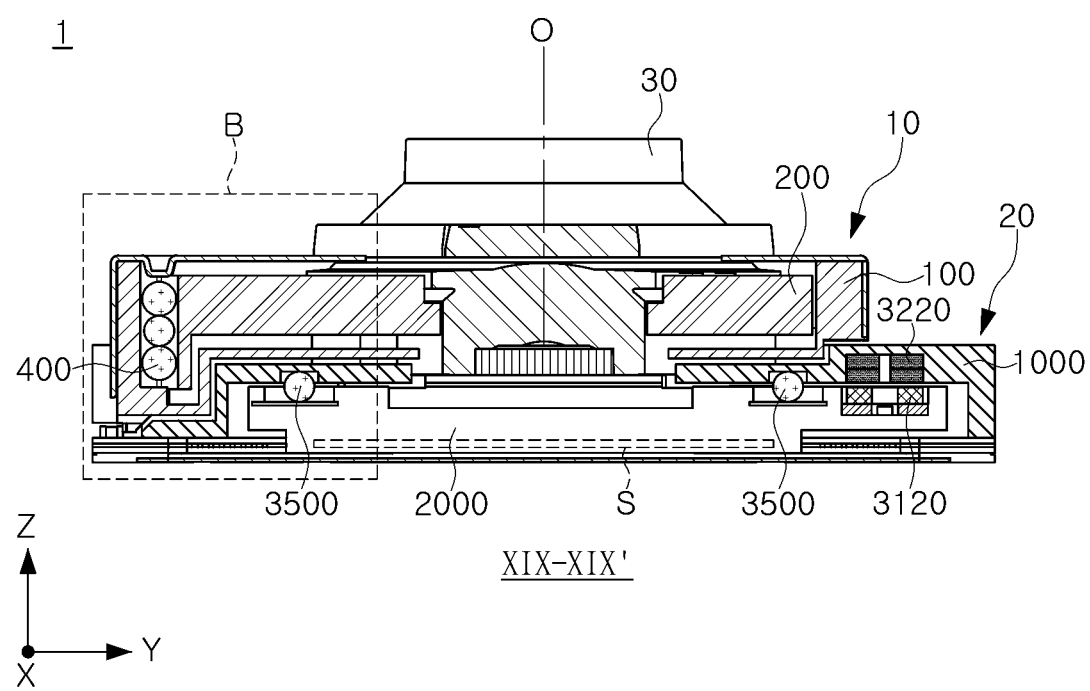
FIG. 19 is a cross-sectional view taken along the line XIX-XIX' of FIG. 1.

FIG. 19 is a cross-sectional view taken along the line XIX-XIX' of FIG. 1. FIG. 20 is an enlarged view of a dashed line portion B of FIG. 19.

Figure 20:
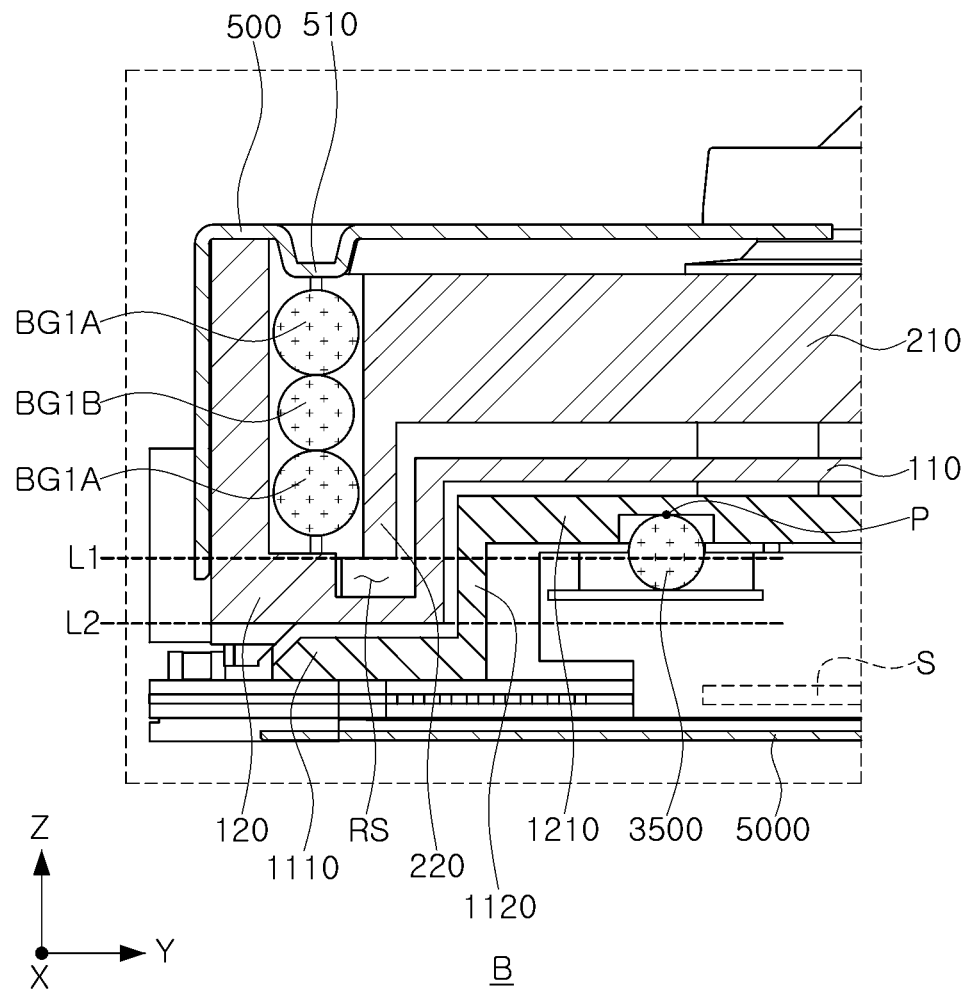
FIG. 20 is an enlarged view of a dashed line portion B of FIG. 19.

Since the first module 10, the second module 20, and the camera module 1 including the first module 10 and the second module 20 shown in FIGS. 19 and 20 correspond to the first module 10 and the second module 20 or 20' and the camera module 1 including the first module 10 and the second module 20 or 20' shown in FIGS. 1 to 18 above, a redundant description thereof may be omitted.

The lens holder 200 has the extension 220 protruding in the optical axis direction (Z-axis direction), and the housing 100 also has the first accommodating portion 120 protruding in the optical axis direction (Z-axis direction). The extension 220 may be accommodated in the receiving space (RS) of the first accommodating portion 120, and the first accommodating portion 120 may be disposed in the second accommodating portion 1110 of the fixed frame 1000.

Since the second accommodating portion 1110 of the fixed frame 1000 has a stepped shape in the upper surface (i.e., the seating portion 1210) of the fixed frame 1000, at least a portion of the first accommodating portion 120 and at least a portion of the extension 220 disposed on the first accommodating portion 120 may be positioned below the seating portion 1210 of the fixed frame 1000 in the optical axis direction (Z-axis direction).

Accordingly, the extension 220 of the lens holder 200 and the first accommodating portion 120 of the housing 100 may overlap the second module 20 in the first direction (e.g., Y-axis direction) perpendicular to the optical axis direction (Z-axis direction).

Here, the "overlapping of two components in the first direction" may mean that, when viewed in the first direction, the two components may be disposed at positions overlapping each other. For example, when the first component and the second component are disposed to overlap each other in the first direction, a virtual line extending in the first direction will pass through both the first component and the second component.

Referring to FIGS. 19 and 20, a virtual first extension line L1 extending in the first direction (Y-axis direction) perpendicular to the optical axis direction (Z-axis direction) from an end portion of the extension 220 of the lens holder 200 in the optical axis direction (Z-axis direction) may pass through the second module 20. For example, the first extension line L1 may pass through any of the step portion 1120 of the fixed frame 1000, the second ball unit 3500, and the moving frame 2000. Alternatively, the first extension line L1 may be positioned below the seating portion 1210 of the fixed frame 1000 in the optical axis direction (Z-axis direction). Alternatively, a distance from the first extension line L1 to the image sensor S may be shorter than a distance from a contact point P between the second ball unit 3500 and the fixed frame 1000 to the image sensor S.

A virtual second extension line L2 extending in the first direction (Y-axis direction) perpendicular to the optical axis direction (Z-axis direction) from the end portion of the first accommodating portion 120 of the housing 100 in the optical axis direction (Z-axis direction) may be disposed below the first extension line L1 in the optical axis direction (Z-axis direction).

The second extension line L2 may pass through the second module 20. For example, the second extension line L2 may pass through either of the step portion 1120 of the fixed frame 1000 and the moving frame 2000. In addition, the first extension line L1 may be positioned below the seating portion 1210 and the second ball unit 3500 of the fixed frame 1000 in the optical axis direction (Z-axis direction). That is, the lower surface of the first accommodating portion 120 of the housing 100 may be located below the second ball unit 3500 included in the second module 20 in the optical axis direction (Z-axis direction). Since the first ball unit 400 may be disposed between the extension 220 and the first accommodating portion 120, among the plurality of balls included in the first ball unit 400, the center of the main ball BG1A disposed at the lowermost side in the optical axis direction (Z-axis direction) may be positioned below the upper surface (i.e., the seating portion 1210) of the fixed frame 1000 in the optical axis direction (Z-axis direction).

For example, referring to FIG. 20, among the plurality of balls included in the first ball unit 400, the main ball BG1A disposed at the lowermost side in the optical axis direction (Z-axis direction) may at least partially overlap the second ball unit 3500 in the first direction (Y-axis direction) perpendicular to the optical axis direction (Z-axis direction).

In the camera module 1, a portion of the first module 10 and a portion of the second module 20 may be configured to overlap each other in the direction perpendicular to the optical axis direction (Z-axis direction), so it is possible to improve the optical performance and driving performance of the camera module 1 without increasing the overall height of the camera module 1.

In addition, since the extension 220 of the lens holder 200 may disposed in the clearance space (i.e., the first accommodating portion 120) provided in the housing 100 and the first accommodating portion 120 of the housing 100 may be disposed in the clearance area (i.e., the second accommodating portion 1110) provided in the fixed frame 1000, even if the extension 220 of the lens holder 200 and the first accommodating portion 120 of the housing 100 protrude in the direction (Z-axis direction), it is possible to keep the height of the entire camera module 1 slim.

In addition, since the first accommodating portion 120 protrudes farther downward than the lower surface 110 of the housing 100 in the optical axis direction (Z-axis direction), the height of the first module 10 for the focus adjustment function may be configured to be slim while securing the installation space for the first driving unit 300 in order to secure a driving force.

The camera module 1 may be configured so that the lens unit 30 is moved in the optical axis direction (Z-axis direction) during autofocus adjustment, and the image sensor S may be configured to be moved in the direction perpendicular to the optical axis direction (Z-axis direction) during the optical image stabilization. Therefore, even if the lens unit 30 is moved in the optical axis direction (Z-axis direction) during the focus adjustment, the relative positions of the driving magnets and the driving coils of the second driving unit 3000 do not change, so it is possible to precisely control a driving force for optical image stabilization. In addition, even if the image sensor S is moved in the direction perpendicular to the optical axis direction (Z-axis direction) the during optical image stabilization, the relative positions of the driving magnet and the driving coil of the first driving unit 300 do not change, so it is possible to precisely control the focus adjustment.

According to example embodiments, it is possible to implement a camera module that does not increase the overall height while having a sufficient space for securing a driving force through a lens holder having a portion that protrudes in the optical axis direction, and a housing structure that may receive the lens holder having the protruding portion.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and are not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
a lens unit comprising one or more lenses disposed in an optical axis direction;
an image sensor on which light passing through the lens unit is incident;
a first module comprising a first driving unit configured to move the lens unit in the optical axis direction; and
a second module comprising a second driving unit configured to move the image sensor in a direction perpendicular to the optical axis direction, the second driving unit being independent of the first driving unit,
wherein the first module further comprises:
a lens holder supporting the lens unit and at least partially overlapping the second module in a first direction perpendicular to the optical axis direction; and
a housing in which the lens holder is disposed.

2. The camera module of claim 1, wherein the lens holder comprises:
a body part in which the lens unit is disposed; and
an extension protruding from the body part in the optical axis direction, and
a virtual first extension line extending in the first direction from an end portion of the extension in the optical axis direction passes through the second module.

3. The camera module of claim 2, wherein the first driving unit comprises:
a first driving coil;
a first driving magnet facing the first driving coil; and
a first position sensor configured to detect a position of the first driving magnet.

4. The camera module of claim 3, wherein the first driving magnet is disposed in the extension, and
the first driving coil is fixed to the housing.

5. The camera module of claim 3, wherein the first module further comprises a first ball unit disposed between the housing and the lens holder, and
the first ball unit comprises:
a first ball group comprising a plurality of balls forming a first column parallel to the optical axis direction; and
a second ball group comprising a plurality of balls forming a second column parallel to the optical axis direction and spaced apart from the first column.

6. The camera module of claim 5, wherein a number of the plurality of balls of the first ball group is different from a number of the plurality of balls of the second ball group.

7. The camera module of claim 5, wherein the plurality of balls of the first ball group comprise a plurality of first main balls and one or more first sub-balls disposed between the plurality of first main balls, and
a diameter of each of the one or more first sub-balls is smaller than a diameter of each of the plurality of first main balls.

8. The camera module of claim 7, wherein the plurality of balls of the second ball group comprise a plurality of second main balls and one or more second sub-balls, and
a spacing between two first main balls that are farthest apart among the plurality of first main balls is greater than a spacing between two second main balls that are farthest apart among the plurality of second main balls.

9. The camera module of claim 8, wherein the first module further comprises a first yoke spaced apart from the first driving magnet in the first direction, and
an action point of a magnetic force applied to the first yoke by the first driving magnet is closer to the first ball group than to the second ball group.

10. The camera module of claim 5, wherein either one or both of the housing and the lens holder comprises:
a first guide groove in which the first ball group is disposed; and
a second guide groove in which the second ball group is disposed, and
a length of the first guide groove in the optical axis direction is greater than or equal to a length of the second guide groove in the optical axis direction.

11. The camera module of claim 10, further comprising a reinforcing member disposed in either one or both of the first guide groove and the second guide groove,
wherein the reinforcing member comprises a material having a degree of stiffness greater than a degree of stiffness of a material forming at least a portion of the lens holder.

12. A camera module comprising:
a lens unit comprising one or more lenses disposed in an optical axis direction;
an image sensor on which light passing through the lens unit is incident;
a first module comprising a first driving unit configured to move the lens unit in the optical axis direction; and
a second module comprising a second driving unit configured to move the image sensor in a direction perpendicular to the optical axis direction,
wherein the first module further comprises:
a lens holder supporting the lens unit and at least partially overlapping the second module in a first direction perpendicular to the optical axis direction; and
a housing in which the lens holder is disposed,
the lens holder comprises:
a body part in which the lens unit is disposed; and
an extension protruding from the body part in the optical axis direction,
a virtual first extension line extending in the first direction from an end portion of the extension in the optical axis direction passes through the second module, and
the second module further comprises:
a moving frame configured to be movable together with the image sensor in the direction perpendicular to the optical axis direction;
a fixed frame in which the moving frame is disposed; and
a second ball unit comprising a plurality of balls disposed between the moving frame and the fixed frame.

13. The camera module of claim 12, wherein the first extension line passes through at least one of the plurality of balls of the second ball unit.

14. The camera module of claim 12, wherein the housing comprises a first accommodating portion having a space in which the extension is accommodated, and
the fixed frame comprises:
a seating portion on which the housing is disposed and comprising an opening through which the light passes;
a second accommodating portion providing a receiving space in which the first accommodating portion is accommodated; and a step portion disposed between the seating portion and the second accommodating portion.

15. The camera module of claim 14, wherein at least a portion of the first accommodating portion faces the step portion in the first direction.

16. The camera module of claim 14, wherein at least a portion of the extension faces the step portion in the direction perpendicular to the optical axis direction with the first accommodating portion interposed therebetween.

17. The camera module of claim 12, wherein the second module further comprises a sensor substrate comprising:
a moving part coupled to the moving frame and supporting the image sensor;
a fixed part coupled to the fixed frame; and
a connection part connecting the moving part and the fixed part to each other.

18. The camera module of claim 12, wherein the second driving unit comprises:
a second driving coil disposed on the moving frame or the fixed frame;
a second driving magnet facing the second driving coil; and
a second position sensor configured to detect a position of the second driving magnet.

19. The camera module of claim 18, wherein the second driving unit further comprises:
a third driving coil disposed at a right angle to the second driving coil;
a third driving magnet facing the third driving coil; and
a third position sensor configured to detect a position of the third driving magnet.

20. A camera module comprising:
a lens unit comprising one or more lenses disposed in an optical axis direction;
a lens holder supporting the lens unit and configured to be movable in the optical axis direction;
a first housing having an internal space in which the lens holder is disposed;
a second housing coupled to the first housing and accommodating an optical member on which light passing through the lens unit is incident; and
a plurality of balls disposed between the lens holder and the first housing and forming a first column and a second column spaced apart from each other and parallel to the optical axis direction,
wherein the balls forming the first column and the balls forming the second column are arranged asymmetrically to each other, and
at least a portion of the first housing is faces the second housing in a direction perpendicular to the optical axis direction.

21. The camera module of claim 20, wherein the balls forming the first column comprise a plurality of first main balls and one or more first sub-balls disposed between the plurality of first main balls, and
a diameter of each of the plurality of first main balls is larger than a diameter of each of the one or more first sub-balls.

22. The camera module of claim 21, wherein the balls forming the second column comprise one or more second main balls and one or more second sub-balls,
two first main balls of the plurality of first main balls are disposed at outermost sides of the first column in the optical axis direction,
a diameter of each of the one or more second sub-balls is smaller than a diameter of each of the one or more second main balls, and
one second sub-ball of the one or more second sub-balls is disposed at one of the outermost sides of the second column in the optical axis direction.

23. The camera module of claim 20, wherein a number of the balls forming the first column is different from a number of the balls forming the second column.

24. The camera module of claim 20, further comprising a case covering an upper portion of the first housing,
wherein the case comprises two protrusions respectively protruding toward the first column and the second column.

25. The camera module of claim 20, further comprising:
a first driving unit configured to move the lens holder in the optical axis direction; and
a second driving unit configured to move the optical member in the direction perpendicular to the optical axis direction,
wherein the first driving unit is disposed in the internal space of the first housing, and
the second driving unit is disposed outside the first housing.

26. The camera module of claim 20, wherein the lens holder comprises:
a body part in which the lens unit is disposed; and
an extension protruding from the body part in the optical axis direction, and
the first housing faces the second housing in the direction perpendicular to the optical axis direction and comprises a first accommodating portion having a space in which the extension is accommodated.

27. The camera module of claim 26, wherein the first accommodating portion protrudes from a lower surface of the first housing in the optical axis direction.

28. The camera module of claim 26, wherein the second housing comprises:
a seating portion on which the first housing is disposed and comprising an opening through which the light passes;
a second accommodating portion providing a receiving space in which the first accommodating portion is accommodated; and
a step portion extending in the optical axis direction and connecting the seating portion to the second accommodating portion.

29. The camera module of claim 28, further comprising a moving frame configured to be movable with respect to the second housing together with the optical member,
wherein at least a portion of the moving frame faces the step portion in the direction perpendicular to the optical axis direction.

* * * * *